United States Patent
Muramoto et al.

(10) Patent No.: US 10,099,252 B2
(45) Date of Patent: Oct. 16, 2018

(54) METHOD FOR FORMING MULTILAYER COATING FILM

(71) Applicants: KANSAI PAINT CO., LTD., Amagasaki-shi (JP); HONDA MOTOR CO., LTD., Tokyo (JP)

(72) Inventors: Ryusuke Muramoto, Kanagawa (JP); Hiroshi Kitagawa, Kanagawa (JP); Yusuke Kurata, Saitama (JP); Takeshi Ogawa, Saitama (JP)

(73) Assignees: KANSAI PAINT CO., LTD., Amagasaki-shi (JP); HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/809,091

(22) Filed: Nov. 10, 2017

(65) Prior Publication Data
US 2018/0133755 A1    May 17, 2018

(30) Foreign Application Priority Data
Nov. 11, 2016    (JP) .................. 2016-220984

(51) Int. Cl.
| | | |
|---|---|---|
| *B05D 7/00* | (2006.01) | |
| *B05D 3/00* | (2006.01) | |
| *B05D 3/02* | (2006.01) | |
| *C09D 1/00* | (2006.01) | |
| *B05D 7/16* | (2006.01) | |
| *B05D 1/04* | (2006.01) | |

(52) U.S. Cl.
CPC ............. *B05D 7/57* (2013.01); *B05D 3/007* (2013.01); *B05D 3/0254* (2013.01); *B05D 7/572* (2013.01); *C09D 1/00* (2013.01); *B05D 1/04* (2013.01); *B05D 2451/00* (2013.01); *B05D 2502/00* (2013.01); *B05D 2503/00* (2013.01); *B05D 2508/00* (2013.01); *B05D 2518/00* (2013.01)

(58) Field of Classification Search
CPC ...................................................... B05D 7/572
USPC ...................................................... 427/407.1
See application file for complete search history.

(56) References Cited

U.S. PATENT DOCUMENTS

| | | | |
|---|---|---|---|
| 2001/0024693 A1 | 9/2001 | Morimoto et al. | |
| 2015/0232693 A1* | 8/2015 | Ishikura | C09D 175/04 428/423.1 |

FOREIGN PATENT DOCUMENTS

| | | |
|---|---|---|
| JP | 2001-205175 A | 7/2001 |
| JP | 2010-253383 A | 11/2010 |

* cited by examiner

*Primary Examiner* — William P Fletcher, III
(74) *Attorney, Agent, or Firm* — Sughrue Mion, PLLC

(57) ABSTRACT

A method for forming a multilayer coating film includes applying an aqueous first base coating composition (A) onto a cured electrodeposition coating film, applying an aqueous second base coating composition (B) without preheating, performing preheating, further applying a clear coating composition (C), and simultaneously heat-curing the first base coating film, the second base coating film, and the clear coating film. The aqueous first base coating composition contains a specific aqueous polyester resin, a specific aqueous acrylic resin, a specific aqueous urethane resin and a melamine resin. A breaking energy of a coating film formed of the aqueous first base coating composition and a peel strength between the coating film and the cured electrodeposition coating film are controlled to specific values.

14 Claims, No Drawings

METHOD FOR FORMING MULTILAYER COATING FILM

CROSS-REFERENCE TO RELATED APPLICATIONS

This application claims priority from Japanese Patent Application No. 2016-220984 filed on Nov. 11, 2016, the entire subject matter of which is incorporated herein by reference.

BACKGROUND OF THE INVENTION

Technical Field

The present invention relates to a method capable of forming a multilayer coating film excellent in smoothness, distinctness of image, and chipping resistance by merely conducting preheating only once in a 3-coat 1-bake system in which an aqueous first base coating composition, an aqueous second base coating composition, and a clear coating composition are applied successively onto/above a substrate and three layers of the obtained multilayer coating film are simultaneously cured by heating.

Background Art

As the method for forming a coating film on an automotive body, for example, a method of forming an electrodeposition coating film on a substrate and then forming a multilayer coating film by a 3-coat 2-bake system of "application of an intermediate coating composition→baking and curing→application of a base coating composition→application of a clear coating composition→baking and curing" is being widely employed.

On the other hand, recently, in view of energy savings, studies are being made on a 3-coat 1-bake system of omitting a baking and curing step after application of an intermediate coating and successively performing application of an intermediate coating composition→preheating→application of a base coating composition→preheating→application of a clear coating composition→baking and curing. In particular, from the viewpoint of reducing environmental pollution due to volatilization of an organic solvent, a 3-coat 1-bake system using an aqueous coating composition for the intermediate coating composition and the base coating composition is demanded.

However, in the coating film formed by the 3-coat 1-bake system using an aqueous intermediate coating composition and an aqueous base coating composition, reduction in smoothness and distinctness of image is likely to occur due to formation of a mixed layer between the layers of aqueous first base coating composition and aqueous second base coating composition.

Patent Document 1 discloses a method for forming a multilayer coating film having an excellent appearance, where the above-described formation of a mixed layer is controlled by using, in a 3-coat 1-bake system, an aqueous intermediate coating composition containing an aqueous dispersion of a specific acrylic resin particle obtained by emulsion polymerization of an amide group-containing ethylenically unsaturated monomer and another ethylenically unsaturated monomer.

On the other hand, recently, from the viewpoint of further saving energy, studies are being made on an intermediate coating-less system of omitting application of an intermediate coating composition and performing, after formation of an electrodeposition coating film on a substrate, "application of a base coating composition→application of a clear coating composition→baking and curing".

In general, the electrodeposition coating film is excellent in rust-preventing property, the intermediate coating film is excellent in smoothness and chipping resistance, and the base coating film and clear coating film are excellent in appearance, so that a multilayer coating film in which these coating films are laminated can impart excellent rust-preventing property, smoothness, chipping resistance and appearance to an object to be coated.

However, the intermediate coating-less system is disadvantageous in that the smoothness and chipping resistance of the obtained multilayer coating film are reduced, because an intermediate coating film excellent in smoothness and chipping are not formed.

Patent Document 2 discloses a method for forming a multilayer coating film, where in the intermediate coating-less system, an aqueous base coating composition containing a specific core/shell-type acrylic resin emulsion, a specific polyether polyol, and an active methylene-type blocked polyisocyanate is used and the appearance of the obtained multilayer coating film can thereby be improved while ensuring the chipping resistance, etc. of the multilayer coating film.

Patent Document 1: JP-A-2001-205175
Patent Document 2: JP-A-2010-253383

SUMMARY OF THE INVENTION

However, in the method for forming a multilayer coating film described in Patent Document 1, it is difficult to omit preheating after application of an intermediate coating composition, and in the method for forming a multilayer coating film described in Patent Document 2, a multilayer coating film having sufficient smoothness, distinctness of image, and chipping resistance may not be obtained.

The present invention provides a method for forming a multilayer coating film (hereinafter, sometimes referred to as an "aqueous 1-preheating 3C1B process") including applying an aqueous first base coating composition, then applying an aqueous second base coating material without performing preheating, and performing preheating, further applying a clear coating composition, and thereafter simultaneously curing three layers, i.e., an aqueous first base coating film, an aqueous second base coating film, and a clea coating film, and a multilayer coating film having excellent smoothness, distinctness of image and chipping resistance and good mechanical properties can be formed.

As a result of many intensive studies to provide the above-described method, the present inventors have found that in a method for forming a multilayer coating film based on the aqueous 1-preheating 3C1B process, when a coating composition containing a specific aqueous polyester resin, a specific aqueous acrylic resin, a specific aqueous urethane resin and a melamine resin is used as an aqueous first base coating composition and the breaking energy of the coating film formed of the aqueous first base coating composition and the peel strength between the coating film formed and the cured electrodeposition coating film are controlled to specific values, a multilayer coating film excellent in smoothness, distinctness of image, chipping resistance and hardness can be formed. The present invention has been accomplished based on this finding.

An aspect of the present invention provides a method for forming a multilayer coating film, comprising:

(1) a step of applying an aqueous first base coating composition (A) onto a cured electrodeposition coating film to form a first base coating film (BC1) with a thickness of cured film of 15 to 35 μm;

(2) a step of applying an aqueous second base coating composition (B) onto the first base coating film without preheating, to form a second base coating film (BC2) with a thickness of cured film of 8 to 18 μm;

(3) a step of, after preheating, applying a clear coating composition (C) onto the second base coating film to form a clear coating film with a thickness of cured film of 25 to 50 μm; and (4) a step of heat-curing the first base coating film, the second base coating film, and the clear coating film simultaneously to form a cured coating film, wherein the aqueous first base coating composition (A) contains from 15 to 35 parts by mass of an aqueous polyester resin (a), from 15 to 30 parts by mass of an aqueous acrylic resin (b), from 15 to 30 parts by mass of an aqueous urethane resin (c), and from 15 to 35 parts by mass of a melamine resin (d), each based on 100 parts by mass of the total resin solid content of the resin (a), resin (b), resin (c) and resin (d), wherein the aqueous polyester resin (a) is obtained using a polybasic acid component containing an aromatic ring-containing polybasic acid and/or an alicyclic ring-containing polybasic acid in a ratio of 65 to 75 mol % based on the total amount of polybasic acids and has an acid value of 15 to 25 mgKOH/g and a number average molecular weight of 1,000 to 5,000, wherein the aqueous acrylic resin (b) is an acrylic emulsion obtained by emulsion polymerization of monomer components containing, based on the total mass of monomers, from 45 to 80 mass % of a polymerizable unsaturated monomer having an alkyl group with 4 to 8 carbon atoms, from 1 to 10 mass % of a hydroxyl group-containing polymerizable unsaturated monomer, from 1 to 10 mass % of a carboxyl group-containing polymerizable unsaturated monomer, and from 0 to 53 mass % of another polymerizable unsaturated monomer, wherein the aqueous urethane resin (c) is obtained by reacting a polyurethane prepolymer that is obtained by reaction of a polyisocyanate compound, a polyol compound containing a polycarbonate polyol having an alicyclic structure, and an acidic group-containing polyol compound, with a chain extender having reactivity with an isocyanate group of the polyurethane polymer, and a ratio of the alicyclic structure contained is from 45 to 65 mass % based on solid content, wherein a braking energy at 20° C. of a coating film formed of the aqueous first base coating composition (A) is 0.6 kgf·mm or more, wherein a peel strength at a coating film interface of the cured electrodeposition coating film and the first base coating film, as measured by surface-interfacial cutting method (SAICAS method), is 0.4 kN/m or more, and wherein in an infrared absorption spectrum, a melamine migration rate that is a value obtained by dividing a peak height ratio of a composite film composed of the first base coating film and the second base coating film by a peak height ratio of a single film of the first base coating film, is from 0 to 25%, wherein each peak height ratio is a ratio between an infrared absorption peak height of ester group at 1,725 $cm^{-1}$ and an infrared absorption peak height of melamine resin at 814 $cm^{-1}$.

In the method for forming a multilayer coating film in an aspect of the present invention, a multilayer coating film excellent in smoothness, distinctness of image, chipping resistance and hardness can be formed by using a specific aqueous 1-preheating 3C1B process.

DETAILED DESCRIPTION OF THE INVENTION

The method for forming a multilayer coating film in an aspect of the present invention is described in detail below.

In the method for forming a multilayer coating film in an aspect of the present invention, first, an electrodeposition coating composition is applied onto a substrate such as steel plate, followed by curing by heating to form a cured electrodeposition coating film.

As the steel plate, a steel plate for automotive body, for example, an alloyed hot-dip galvanized steel plate, a hot-dip galvanized steel plate, an electrogalvanized steel plate, or a cold-rolled steel plate can be used, and the steel plate may be a steel plate of which surface is subjected to a surface treatment such as phosphate treatment, chromate treatment or composite oxide treatment.

As the electrodeposition coating composition, an electrodeposition coating composition that is known per se (for example, those described in JP-A-2003-306796) can be used, and in particular, a cationic electrodeposition coating composition may be suitably used.

(Step (1))

Subsequently, an aqueous first base coating composition (A) is applied onto the cured electrodeposition coating film to form a first base coating film (BC1) giving a cured film thickness of 15 to 35 μm.

<Aqueous First Base Coating Composition (A)>

The aqueous first base coating composition (A) contains from 15 to 35 parts by mass of an aqueous polyester resin (a), from 15 to 30 parts by mass of an aqueous acrylic resin (b), from 15 to 30 parts by mass of an aqueous urethane resin (c), and from 15 to 35 parts by mass of a melamine resin (d), each based on 100 parts by mass of the total resin solid content of the resin (a), resin (b), resin (c) and resin (d).

<<Aqueous Polyester Resin (a)>>

The aqueous polyester resin (a) is a polyester resin having an acid value of 15 to 25 mgKOH/g and a number average molecular weight of 1,000 to 5,000, which is obtained using a polybasic acid component containing from 65 to 75 mol % of an aromtaci-containing polybasic acid and/or an alicyclic ring-containing polybasic acid based on the total amount of polybasic acids.

The aqueous polyester resin (a) is usually obtained by an esterification or transesterification reaction of the following polybasic acid component (a-1) and alcohol component (a-2).

[Polybasic Acid Component (a-1)]

As the polybasic acid component (a-1), from the viewpoint of preventing formation of a mixed layer of the aqueous first base coating composition (A) and the later-described aqueous second base coating composition (B) and forming a multilayer coating film excellent in smoothness, distinctness of image, chipping resistance and hardness, a component containing an aromatic ring-containing polybasic acid (hereinafter, referred to as "aromatic polybasic acid") (a-1-1) and/or an alicyclic ring-containing polybasic acid (hereinafter, referred to as "alicyclic polybasic acid") (a-1-2) is used. The total content of the aromatic polybasic acid (a-1-1) and the alicyclic polybasic acid (a-1-2) in the polybasic acid component (a-1) is generally from 65 to 75 mol %, suitably from 65 to 70 mol %, based on the total amount of the polybasic acid component (a-1).

The aromatic polybasic acid (a-1-1) generally encompasses, e.g., an aromatic compound having at least two, preferably two or three, carboxyl groups per molecule, an acid anhydride of the aromatic compound, and an esterification product of the aromatic compound, and examples thereof include, for example, an aromatic polyvalent carboxylic acid such as phthalic acid, isophthalic acid, terephthalic acid, naphthalenedicarboxylic acid, 4,4'-biphenyldicarboxylic acid, trimellitic acid and pyromellitic acid; an anhydride of the aromatic polyvalent carboxylic acid; and a lower alkyl esterification product of the aromatic polyvalent carboxylic acid. One of these aromatic polybasic acids (a-1-1) may be used alone, or two or more thereof may be used in combination. Among them, in view of distinctness of image, chipping resistance, etc. of the obtained multilayer coating film, phthalic acid, phthalic anhydride, isophthalic acid, trimellitic acid, and trimellitic anhydride are preferably used.

The alicyclic polybasic acid (a-1-2) generally encompasses, e.g., a compound having at least one alicyclic structure (mainly 4- to 6-membered ring structure) and at least two, preferably two or three, carboxyl groups per molecule, an acid anhydride of the compound, and an esterification product of the compound, and examples thereof include, for example, an alicyclic polyvalent carboxylic acid such as 1,2-cyclohexanedicarboxylic acid, 1,3-cyclohexanedicarboxylic acid, 1,4-cyclohexanedicarboxylic acid, 4-cyclohexene-1,2-dicarboxylic acid, 3-methyl-1,2-cyclohexanedicarboxylic acid, 4-methyl-1,2-cyclohexanedicarboxylic acid, 1,2,4-cyclohexanetricarboxylic acid and 1,3,5-cyclohexanetricarboxylic acid; an anhydride of the alicyclic polyvalent carboxylic acid; and a lower alkyl esterification product of the alicyclic polyvalent carboxylic acid. One of these alicyclic polybasic acids (a-1-2) may be used alone, or two or more thereof may be used in combination. Among them, in view of distinctness of image, chipping resistance, etc. of the obtained multilayer coating film, 1,2-cyclohexanedicarboxylic acid, 1,2-cyclohexanedicarboxylic anhydride, 1,3-cyclohexanedicarboxylic acid, 1,4-cyclohexanedicarboxylic acid, 4-cyclohexene-1,2-dicarboxylic acid, and 4-cyclohexene-1,2-dicarboxylic anhydride are preferably used.

In the present specification, the term "lower" means that the carbon number of the organic group to which this term is affixed is 6 or less, preferably 4 or less.

In view of chipping resistance of the obtained multilayer coating film, it is preferable to use an alicyclic polybasic acid (a-1-2) alone or use an aromatic polybasic acid (a-1-1) and an alicyclic polybasic acid (a-1-2) in combination. The ratio between two components is, in terms of the molar ratio of aromatic polybasic acid (a-1-1)/alicyclic polybasic acid (a-1-2), generally from 90/10 to 0/100, preferably from 50/50 to 0/100, more preferably from 35/65 to 0/100.

As the polybasic acid component (a-1), in addition to the above-described aromatic polybasic acid (a-1-1) and alicyclic polybasic acid (a-1-2), another polybasic acid component may be used, and among others, an aliphatic polybasic acid (a-1-3) may be suitably used.

The aliphatic polybasic acid (a-1-3) generally encompasses, e.g., an aliphatic compound having at least two, preferably two, carboxyl groups per molecule, an acid anhydride of the aliphatic compound, and an esterification product of the aliphatic compound, and examples thereof include, for example, an aliphatic polyvalent carboxylic acid such as succinic acid, glutaric acid, adipic acid, pimelic acid, suberic acid, azelaic acid, sebacic acid, undecanedioic acid, dodecanedioic acid, brasylic acid, octadecanedioic acid and citric acid; an anhydride of the aliphatic polyvalent carboxylic acid; and a lower alkyl esterification product of the aliphatic polyvalent carboxylic acid. One of these aliphatic polybasic acids may be used alone, or two or more thereof may be used in combination. Among them, in view of smoothness etc., of the obtained multilayer coating film, an adipic acid is preferably used.

The polybasic acid component other than the aromatic polybasic acid (a-1-1), alicyclic polybasic acid (a-1-2) and aliphatic polybasic acid (a-1-3) is not particularly limited, and examples thereof include, for example, a fatty acid such as palm oil fatty acid, cottonseed oil fatty acid, hempseed oil fatty acid, rice bran oil fatty acid, fish oil fatty acid, tall oil fatty acid, soybean oil fatty acid, linseed oil fatty acid, tung oil fatty acid, rapeseed oil fatty acid, castor oil fatty acid, dehydrated castor oil fatty acid and safflower oil fatty acid; a monocarboxylic acid such as lauric acid, myristic acid, palmitic acid, stearic acid, oleic acid, linoleic acid, linolenic acid, benzoic acid, p-tert-butylbenzoic acid, cyclohexanoic acid and 10-phenyloctadecanoic acid; and a hydroxycarboxylic acid such as lactic acid, 3-hydroxybutanoic acid and 3-hydroxy-4-ethoxybenzoic acid. One of these other polybasic acid components may be used alone, or two or more thereof may be used in combination.

The aromatic polybasic acid (a-1-1) and the alicyclic polybasic acid (a-1-2) may be used in the range of, in total, from 65 to 75 mol %, particularly from 65 to 70 mol %, based on the total amount of polybasic acid components used.

[Alcohol Component (a-2)]

As the alcohol component (a-2), a polyhydric alcohol having at least two, preferably two or three, hydroxyl groups per molecule may be suitably used. Examples of the polyhydric alcohol include, for example, a dihydric alcohol such as ethylene glycol, propylene glycol, diethylene glycol, trimethylene glycol, tetraethylene glycol, triethylene glycol, dipropylene glycol, 1,4-butanediol, 1,3-butanediol, 2,3-butanediol, 1,2-butanediol, 3-methyl-1,2-butanediol, 2-butyl-2-ethyl-1,3-propanediol, 1,2-pentanediol, 1,5-pentanediol, 1,4-pentanediol, 2,4-pentanediol, 2,3-dimethyltrimethylene glycol, tetramethylene glycol, 3-methyl-4,3-pentanediol, 3-methyl-1,5-pentanediol, 2,2,4-trimethyl-1,3-pentanediol, 1,6-hexanediol, 1,5-hexanediol, 1,4-hexanediol, 2,5-hexanediol, neopentyl glycol, 1,4-cyclohexanedimethanol, tricyclodecanedimethanol, hydrogenated bisphenol A and hydrogenated bisphenol F; a polylactone diol obtained by adding lactones, such as ε-caprolactone, to the dihydric alcohol above; ester diols such as bis(hydroxyethyl)terephthalate; polyether diols such as alkylene oxide adduct of bisphenol A, polyethylene glycol, polypropylene glycol and polybutylene glycol; a trihydric or higher polyhydric alcohol such as glycerin, trimethylolethane, trimethylolpropane, diglycerin, triglycerin, 1,2,6-hexanetriol, pentaerythritol, dipentaerythritol, sorbitol and mannite; and polylactone polyols obtained by adding lactones, such as ε-caprolactone, to the trihydric or higher polyhydric alcohol above.

In addition to the above-described polyhydric alcohol, another alcohol component may also be used as the alcohol component (a-2), and examples of another alcohol component include, for example, a monoalcohol such as methanol, ethanol, propyl alcohol, butyl alcohol, stearyl alcohol and 2-phenoxy ethanol; and an alcohol compound obtained by reacting an acid with a monoepoxy compound such as propylene oxide, butylene oxide and glycidyl ester of synthetic hyperbranched saturated fatty acid (trade name: "Cardura E10", produced by HEXION Specialty Chemicals). One of the alcohol components (a-2) may be used alone, or two or more thereof may be used in combination. Among them, in view of smoothness, chipping resistance, etc. of the obtained multilayer coating film, neopentyl glycol and trimethylolpropane are preferably used.

The production of the aqueous polyester resin (a) is not particularly limited and can be performed using a method that is usually employed for the production of a polyester resin. Examples of the method include, for example, a method of performing an esterification reaction or a transesterification reaction by reacting a polybasic acid component (a-1) and an alcohol component (a-2) at a temperature of about 150 to about 250° C. for 5 to 10 hours in an inert gas atmosphere, for example, in a nitrogen gas flow.

In the esterification reaction or transesterification reaction, the polybasic acid component (a-1) and the alcohol component (a-2) may be added all at once or may be added in several parts. It is also possible to first synthesize a carboxyl group-containing polyester resin and then esterify at least a part of carboxyl groups in the carboxyl group-containing polyester resin by using the alcohol component (a-2). In addition, after first synthesizing a hydroxyl group-containing polyester resin, the hydroxyl group-containing polyester resin may be reacted with an acid anhydride, thereby being half-esterified.

At the esterification or transesterification reaction, a catalyst may be used to accelerate the reaction. Examples of the catalyst include, for example, conventional catalysts such as dibutyltin oxide, antimony trioxide, zinc acetate, manganese acetate, cobalt acetate, calcium acetate, lead acetate, tetrabutyl titanate and tetraisopropyl titanate.

In addition, the aqueous polyester resin (a) may be modified with an aliphatic acid, a monoepoxy compound, a polyisocyanate compound, etc., during preparation of the resin, after the esterification reaction, or after the transesterification reaction.

Examples of the fatty acid include, for example, a palm oil fatty acid, a cottonseed oil fatty acid, a hempseed oil fatty acid, a rice bran oil fatty acid, a fish oil fatty acid, a tall oil fatty acid, a soybean oil fatty acid, a linseed oil fatty acid, a tung oil fatty acid, a rapeseed oil fatty acid, a castor oil fatty acid, a dehydrated castor oil fatty acid, and a safflower oil fatty acid.

As the monoepoxy compound, for example, a synthetic hyperbranched saturated fatty acid glycidyl ester (trade name: "Cardura E10", produced by HEXION Specialty Chemicals) may be suitably used.

Examples of the polyisocyanate compound include, for example, aliphatic diisocyanates such as lysine diisocyanate, hexamethylene diisocyanate and trimethylhexane diisocyanate; alicyclic diisocyanates such as hydrogenated xylene diisocyanate, isophorone diisocyanate, methylcyclohexane-2,4-diisocyanate, methylcyclohexane-2,6-diisocyanate, 4,4'-methylenebis(cyclohexylisocyanate) and 1,3-(isocyanatomethyl)cyclohexane; aromatic diisocyanates such as tolylene diisocyanate, xylylene diisocyanate and diphenylmethane diisocyanate; and an organic polyisocyanate itself such as trivalent or higher valent polyisocyanate, e.g., lysine triisocyanate, and an adduct of the organic polyisocyanate and a polyhydric alcohol, a low-molecular-weight polyester resin, water etc., and a cyclized polymer (e.g., isocyanurate) or biuret-type adduct of the organic diisocyanates to each other. One of these may be used alone, or two or more thereof may be used in combination.

In view of water resistance, hardness, etc. of the obtained multilayer coating film, the aqueous polyester resin (a) has a hydroxyl value of generally from 60 to 200 mgKOH/g, preferably from 80 to 180 mgKOH/g, more preferably from 100 to 150 mgKOH/g.

In the present specification, the hydroxyl value (mgKOH/g) is the number of milligrams of potassium hydroxide equivalent to the hydroxyl content of 1 gram of the sample (in the case of a resin, the sample being a solid content of the resin). The molecular weight of potassium hydroxide is 56.1.

In view of water resistance, distinctness of image, etc. of the obtained multilayer coating film, the aqueous polyester resin (a) has an acid value of generally from 15 to 25 mgKOH/g, preferably from 18 to 23 mgKOH/g, more preferably from 19 to 22 mgKOH/g.

In the present specification, the acid value (mgKOH/g) is the number of milligrams of potassium hydroxide equivalent to the acid content of 1 gram of the sample (in the case of a resin, the sample being a solid content of the resin). The molecular weight of potassium hydroxide is 56.1.

The hydroxyl value and the acid value of the aqueous polyester resin (a) can be adjusted, for example, by adjusting the blending ratio of the polybasic acid component (a-1) and the alcohol component (a-2) or by adjusting the reaction temperature or reaction time in the esterification reaction or transesterification reaction described above.

In view of smoothness, distinctness of image, chipping resistance, hardness, etc. of the obtained multilayer coating film, the aqueous polyester resin (a) has a number average molecular weight of generally from 1,000 to 5,000, preferably from 1,200 to 4,000, more preferably from 1,250 to 3,000.

The number average molecular weight of the aqueous polyester resin (a) can be adjusted, for example by adjusting the reaction temperature or reaction time in the esterification reaction or transesterification reaction described above.

In the present specification, the number average molecular weight and weight average molecular weight are values obtained by converting the number average molecular weight and weight average molecular weight as measured by gel permeation chromatography (GPC), based on the molecular weight of standard polystyrene. More specifically, these molecular weights can be measured by using "HLC8120GPC" (trade name, manufactured by Tosoh Corp.) as the gel permeation chromatograph and using four columns of "TSKgel G-4000HXL", "TSKgel G-3000HXL", "TSKgel G-2500HXL" and "TSKgel G-2000HXL" (trade names, all manufactured by Tosoh Corp.) under the conditions of a mobile phase of tetrahydrofuran, a measurement temperature of 40° C., a flow rate of 1 mL/min and a detector of RI. As the "standard polystyrene", a commercially available standard polystyrene, for example, "TSK Standard Polystyrene" produced by Tosoh Corp., can be used.

The aqueous polyester resin (a) can be made water-soluble or water-dispersible by neutralizing the carboxyl group in the molecule with a basic compound. Examples of the basic compound include, for example, a hydroxide of an alkali metal or alkaline earth metal, such as sodium hydroxide, potassium hydroxide, lithium hydroxide, calcium hydroxide and barium hydroxide; ammonia; a primary monoamine such as ethylamine, propylamine, butylamine, benzylamine, monoethanolamine, neopentanolamine, 2-aminopropanol, 2-amino-2-methyl-1-propanol and 3-aminopropanol; a secondary monoamine such as diethylamine, diethanolamine, di-n-propanolamine, di-iso-propanolamine, N-methylethanolamine and N-ethylethanolamine; a tertiary monoamine such as dimethylethanolamine, trimethylamine, triethylamine, triisopropylamine, methyldiethanolamine and 2-(dimethylamino)ethanol; and a polyamine such as diethylenetriamine, hydroxyethylaminoethylamine, ethylaminoethylamine and methylaminopropylamine.

In view of water resistance etc. of the obtained multilayer coating film, the used amount of the basic compound is preferably from about 0.1 to about 1.5 equivalents, more preferably from about 0.2 to about 1.2 equivalents, relative to the acid group of the aqueous polyester resin (a).

<<Aqueous Acrylic Resin (b)>>

As the aqueous acrylic resin (b), from the viewpoint of inhibiting formation of a mixed layer of the aqueous first base coating composition (A) and the later-described aqueous second base coating composition (B) and forming a multilayer coating film excellent in smoothness, distinctness of image, chipping resistance and hardness, an acrylic emulsion obtained by emulsion polymerization of monomer components containing from 45 to 80 mass % of a polymerizable unsaturated monomer (b-1) having an alkyl group with 4 to 8 carbon atoms, from 1 to 10 mass % of a hydroxyl group-containing polymerizable unsaturated monomer (b-2), from 1 to 10 mass % of a carboxyl group-containing polymerizable unsaturated monomer (b-3) and from 0 to 53 mass % of another polymerizable unsaturated monomer (b-4), each based on the total mass of the monomers, is used.

As the polymerizable unsaturated monomer (b-1) having an alkyl group with 4 to 8 carbon atoms, for example, a monoesterification product of a (meth)acrylic acid and a monohydric alcohol having an alkyl group with 4 to 8 carbon atoms may be used. Specific examples thereof include n-butyl (meth)acrylate, iso-butyl (meth)acrylate, tert-butyl (meth)acrylate, pentyl (meth)acrylate, hexyl (meth)acrylate, octyl (meth)acrylate, and 2-ethylhexyl (meth)acrylate, and one of these may be used alone, or two or more thereof may be used in combination.

In the present specification, the "(meth)acrylate" means acrylate or methacrylate, and the "(meth)acrylic acid" means acrylic acid or methacrylic acid. Likewise, the "(meth)acryloyl" means acryloyl or methacryloyl, and the "(meth)acrylamide" means acrylamide or methacrylamide.

As the polymerizable unsaturated monomer (b-1) having an alkyl group with 4 to 8 carbon atoms, in view of distinctness of image, water resistance, etc. of the obtained multilayer coating film, it is preferable to use n-butyl (meth)acrylate, 2-ethylhexyl (meth)acrylate, etc.

As the hydroxyl group-containing polymerizable unsaturated monomer (b-2), it is preferable to use a monomer having one hydroxyl group and one polymerizable double bond per molecule, for example, a monoesterification product of a (meth)acrylic acid and a dihydric alcohol having 2 to 8 carbon atoms, preferably 2 to 4 carbon atoms, such as 2-hydroxyethyl (meth)acrylate, 2-hydroxypropyl (meth)acrylate, 3-hydroxypropyl (meth)acrylate and 4-hydroxybutyl (meth)acrylate; the monoesterification product of a (meth)acrylic acid and a dihydric alcohol having 2 to 8 carbon atoms, which is modified with ε-caprolactone; N-hydroxymethyl (meth)acrylamide; allyl alcohol; and a (meth)acrylate having polyoxyethylene chain with the molecular terminal being a hydroxyl group. One of these may be used alone, or two or more thereof may be used in combination. Among them, in view of smoothness, distinctness of image, water resistance, etc. of the obtained multilayer coating film, 2-hydroxyethyl (meth)acrylate, 2-hydroxypropyl (meth)acrylate, 3-hydroxypropyl (meth)acrylate, 4-hydroxybutyl (meth)acrylate, etc. are preferably used.

As the carboxyl group-containing polymerizable unsaturated monomer (b-3), a monomer having one carboxyl group and one polymerizable double bond per molecule is preferred, and examples thereof include (meth)acrylic acid, maleic acid, crotonic acid, and β-carboxyethyl acrylate. One of these may be used alone, or two or more thereof may be used in combination. Among them, in view of smoothness, distinctness of image, water resistance, etc. of the obtained multilayer coating film, acrylic acid and methacrylic acid are preferably used.

The another polymerizable unsaturated monomer (b-4) is a polymerizable unsaturated monomer other than the polymerizable unsaturated monomers (b-1) to (b-3), and examples of the another polymerizable unsaturated monomer (b-4) include, for example, an alkyl (meth)acrylate having an alkyl group, e.g., an alkyl or cycloalkyl (meth)acrylate, such as methyl (meth)acrylate, ethyl (meth)acrylate, n-propyl (meth)acrylate, iso-propyl (meth)acrylate, nonyl (meth)acrylate, dodecyl (meth)acrylate (lauryl (meth)acrylate), tridecyl (meth)acrylate, stearyl (meth)acrylate, isostearyl (meth)acrylate, cyclohexyl (meth)acrylate, methylcyclohexyl (meth)acrylate, tert-butylcyclohexyl (meth)acrylate, cyclododecyl (meth)acrylate, isobornyl (meth)acrylate, adamantyl (meth)acrylate and tricyclodecanyl (meth)acrylate; an aromatic ring-containing polymerizable unsaturated monomer such as benzyl (meth)acrylate, styrene, α-methylstyrene and vinyltoluene; an alkoxysilyl group-containing polymerizable unsaturated monomer such as vinyltrimethoxysilane, vinyltriethoxysilane, vinyltris(2-methoxyethoxy)silane, γ-(meth)acryloyloxypropyltrimethoxysilane and γ-(meth)acryloyloxypropyltriethoxysilane; a perfluoroalkyl (meth)acrylate such as perfluorobutylethyl (meth)acrylate and perfluorooctylethyl (meth)acrylate; a fluorinated alkyl group-containing polymerizable unsaturated monomer such as fluoroolefin; a photopolymerizable functional group-containing polymerizable unsaturated monomer such as maleimide group-containing polymerizable unsaturated monomer; a vinyl compound such as N-vinyl pyrrolidone, ethylene, butadiene, chloroprene, vinyl propionate and vinyl acetate; a polymerizable unsaturated monomer having at least two polymerizable unsaturated groups per molecule, such as allyl (meth)acrylate, ethylene glycol di(meth)acrylate, triethylene glycol di(meth)acrylate, tetraethylene glycol di(meth)acrylate, 1,3-butylene glycol di(meth)acrylate, trimethylolpropane tri(meth)acrylate, 1,4-butanediol di(meth)acrylate, neopentyl glycol di(meth)acrylate, 1,6-hexanediol di(meth)acrylate, pentaerythritol di(meth)acrylate, pentaerythritol tetra(meth)acrylate, glycerol di(meth)acrylate, 1,1,1-trishydroxymethylethane di(meth)acrylate, 1,1,1-trishydroxymethylethane tri(meth)acrylate, 1,1,1-trishydroxymethylpropane tri(meth)acrylate, triallyl isocyanurate, diallyl terephthalate and divinylbenzene; a nitrogen-containing polymerizable unsaturated monomer such as (meth)acrylonitrile, (meth)acrylamide, N,N-dimethylaminoethyl (meth)acrylate, N,N-diethylaminoethyl (meth)acrylate, N,N-dimethylaminopropyl (meth)acrylamide and adduct of glycidyl (meth)acrylate and amines; an epoxy group-containing polymerizable unsaturated monomer such as glycidyl (meth)acrylate, β-methylglycidyl (meth)acrylate, 3,4-epoxycyclohexylmethyl (meth)acrylate, 3,4-epoxycyclohexylethyl (meth)acrylate, 3,4-epoxycyclohexylpropyl (meth)acrylate and allyl glycidyl ether, an isocyanate group-containing polymerizable unsaturated monomer such as 2-isocyanatoethyl (meth)acrylate and m-isopropenyl-α,α-dimethylbenzylisocyanate; a (meth)acrylate having a polyoxyethylene chain with the molecular terminal being an alkoxy group; and a carbonyl group-containing polymerizable unsaturated monomer such as acrolein, diacetone acrylamide, diacetone methacrylamide, acetoacetoxyethyl methacrylate, formylstyrol and vinyl alkyl ketone having from 4 to 7 carbon atoms (e.g., vinyl methyl ketone, vinyl ethyl ketone, vinyl butyl ketone). One of these polymerizable unsaturated monomers may be alone, or two or more thereof may be used in combination.

The acrylic resin (b) can be produced by copolymerizing the above-described monomer components through emulsion polymerization in an aqueous medium. More specifically, the resin can be produced, for example, by performing emulsion polymerization of the above-described monomer components with use of a polymerization initiator in the presence of a surfactant.

The surfactant is suitably an anionic surfactant or a nonionic surfactant. Examples of the anionic surfactant include, for example, sodium and ammonium salts of an alkylsulfonic acid, an alkylbenzenesulfonic acid, an alkylphosphoric acid, etc., and examples of the nonionic surfactant include, for example, polyoxyethylene oleyl ether, polyoxyethylene stearyl ether, polyoxyethylene lauryl ether, polyoxyethylene tridecyl ether, polyoxyethylene phenyl ether, polyoxyethylene nonylphenyl ether, polyoxyethylene octylphenyl ether, polyoxyethylene monolaurate, polyoxyethylene monostearate, polyoxyethylene monooleate, sorbitan monolaurate, sorbitan monostearate, sorbitan trioleate, and polyoxyethylene sorbitan monolaurate.

In addition, a polyoxyalkylene group-containing anionic surfactant having, per molecule, an anionic group and a polyoxyalkylene group such as polyoxyethylene group or polyoxypropylene group; and a reactive anionic surfactant having, per molecule, an anionic group and a radically polymerizable unsaturated group, can also be used.

The used amount of the surfactant is in the range of usually from 0.1 to 15 mass %, preferably from 0.5 to 10 mass %, more preferably from 1 to 5 mass %, based on the total mass of all monomers used.

Examples of the polymerization initiator include, for example, an organic peroxide such as benzoyl peroxide, octanoyl peroxide, lauroyl peroxide, stearoyl peroxide, cumene hydroperoxide, tert-butyl peroxide, di-tert-amyl peroxide, tert-butylperoxy laurate, tert-butylperoxyisopropyl carbonate, tert-butylperoxy acetate and diisopropylbenzene hydroperoxide; an azo compound such as azobisisobutyronitrile, azobis(2,4-dimethylvaleronitrile), azobis(2-methylpropionitrile), azobis(2-methylbutyronitrile), 4,4'-azobis(4-cyanobutanoic acid), dimethylazobis(2-methylpropionate), azobis[2-methyl-N-(2-hydroxyethyl) propionamide] and azobis{2-methyl-N-[2-(1-hydroxybutyl)]-propionamide}; and a persulfate such as potassium persulfate, ammonium persulfate and sodium persulfate. One of these polymerization initiators may be used alone, or two or more thereof may be used in combination. In addition, a reducing agent such as sugar, sodium formaldehyde sulfoxylate or iron complex may be used, if desired, in combination with the polymerization initiator to make a redox initiator.

The used amount of the polymerization initiator is in the range of generally from 0.05 to 5 mass %, preferably from 0.1 to 3 mass %, based on the total mass of all monomers used. The method for adding the polymerization initiator is not particularly limited and may be appropriately selected according to the kind or amount of the polymerization initiator. For example, the polymerization initiator may previously incorporated into a monomer component or an aqueous medium or may be added all at once or dropwise during polymerization.

The above-described monomer component may contain a component such as chain transfer agent, if desired. The monomer component may be directly added dropwise but is preferably added as a monomer emulsion obtained by dispersing the monomer component in an aqueous medium. The particle diameter of the monomer emulsion here is not particularly limited.

The aqueous acrylic resin (b) obtained in this way may have an average particle diameter in the range of generally from about 10 nm to about 1,000 nm, preferably from about 15 nm to about 750 nm, more preferably from about 20 nm to about 500 nm.

In the present specification, the average particle diameter of the aqueous acrylic resin (b) is a value measured by a submicron particle size analyzer at 20° C. after diluting the resin with deionized water in the usual manner. As the submicron particle size analyzer, for example, "COULTER Type N4" (trade name, manufactured by Beckman Coulter Inc.) can be used.

In the monomer components, from the viewpoint of inhibiting formation of a mixed layer of the aqueous first base coating composition (A) and the later-described aqueous second base coating composition (B) and forming a multilayer coating film excellent in smoothness, distinctness of image, chipping resistance and hardness, the polymerizable unsaturated monomer (b-1) having an alkyl group with 4 to 8 carbon atoms, the hydroxyl group-containing polymerizable unsaturated monomer (b-2), the carboxyl group-containing polymerizable unsaturated monomer (b-3) and another polymerizable unsaturated monomer (b-4) are preferably used in the following ratio based on the total mass of monomer components.

Polymerizable unsaturated monomer (b-1) containing an alkyl group with 4 to 8 carbon atoms: from 45 to 80 mass %, preferably from 50 to 75 mass %, more preferably from 55 to 70 mass %, hydroxyl group-containing polymerizable unsaturated monomer (b-2): from 1 to 10 mass %, preferably from 2 to 9 mass %, more preferably from 4 to 8 mass %, carboxyl group-containing polymerizable unsaturated monomer (b-3): from 1 to 10 mass %, preferably from 1 to 8 mass %, more preferably from 1 to 6 mass %, and another polymerizable unsaturated monomer (b-4): from 0 to 53 mass %, preferably from 8 to 47 mass %, more preferably from 10 to 46 mass %.

In view of storage stability as well as water resistance, etc. of the obtained multilayer coating film, the aqueous acrylic resin (b) has a hydroxyl value in the range of generally from 4.5 to 50 mgKOH/g, preferably from 9 to 43 mgKOH/g, more preferably from 10 to 40 mgKOH/g.

In view of smoothness, distinctness of image, chipping resistance, water resistance, etc. of the obtained multilayer coating film, the aqueous acrylic resin (b) has an acid value in the range of generally from 7 to 75 mgKOH/g, preferably from 7.5 to 60 mgKOH/g, more preferably from 10 to 50 mgKOH/g.

Furthermore, in view of smoothness, water resistance, etc. of the obtained multilayer coating film, the aqueous acrylic resin (b) has a weight average molecular weight in the range of generally from 2,000 to 5,000,000, preferably from 3,000 to 3,000,000, more preferably from 5,000 to 2,000,000.

<<Aqueous Urethane Resin (c)>>

The aqueous urethane resin (c) means a polyurethane resin capable of being dispersed in an aqueous medium containing water as a main solvent or dispersion medium and, in the aqueous medium, may take any of a water-soluble form, a colloidal dispersion form, an emulsion form and a slurry form, but among them, a colloidal dispersion form or an emulsion form is preferred.

The aqueous urethane resin (c) in an aspect of the present invention is obtained by reacting a polyurethane prepolymer (c-1) that is obtained by the reaction of a polyisocyanate compound (c-1-1) as a polyisocyanate component and polyol components, i.e., a polyol compound (c-1-2) containing a polycarbonate polyol having an alicyclic structure and an acidic group-containing polyol compound (c-1-3), with a chain extender (c-2) having reactivity with an isocyanate group of the polyurethane prepolymer (c-1).

[Polyisocyanate Compound (c-1-1)]

Examples of the polyisocyanate compound (c-1-1) include, for example, an alicyclic diisocyanate, an aromatic diisocyanate, an aliphatic diisocyanate, and a polyisocyanate having three or more isocyanate groups per molecule.

Examples of the alicyclic diisocyanate include, for example, isophorone diisocyanate, dicyclohexylmethane-4,4'-diisocyanate (hydrogenated MDI), trans-1,4-cyclohexyl diisocyanate, and norbornene diisocyanate.

Of these alicyclic diisocyanates, from the viewpoint of enhancing the anti-organic solvent swelling property of the obtained coating film, isophorone diisocyanate and dicyclohexylmethane-4,4'-diisocyanate are preferred.

Examples of the aromatic diisocyanate include, for example, tolylene diisocyanate, diphenylmethane-4,4'-diisocyanate, p-phenylene diisocyanate, xylylene diisocyanate, 1,5-naphthalene diisocyanate, 3,3'-dimethyldiphenyl-4,4'-diisocyanate, dianisidine diisocyanate, and tetramethylxylylene diisocyanate.

Examples of the aliphatic diisocyanate include, for example, 1,6-hexamethylene diisocyanate, 2,2,4 and/or (2,4,4)-trimethylhexamethylene diisocyanate, and lysine diisocyanate.

Examples of the polyisocyanate having three or more isocyanate groups per molecule include, for example, isocyanurate trimers, biuret trimers and trimethylolpropane adducts of the above-exemplified diisocyanates: and a trifunctional or higher functional isocyanate such as triphenylmethane triisocyanate, 1-methylbenzole-2,4,6-triisocyanate and dimethyltriphenylmethane tetraisocyanate. Such an isocyanate compound may also be used in the form of a modified product by carbodiimide modification, isocyanurate modification, biuret modification, etc.

The polyisocyanate may also be used in the form of a blocked isocyanate blocked with a blocking agent.

[Polyol Compound (c-1-2)]

The polyol compound (c-1-2) is a polyol compound containing a polycarbonate polyol having an alicyclic structure. However, a polyol compound containing an acidic group is not encompassed by the polyol compound (c-1-2).

The polycarbonate polyol having an alicyclic structure is a compound obtained by the polycondensation reaction of a conventional polyol with a carbonylating agent in a usual manner. Here, the polyol contains at least one polyol having an alicyclic structure. Examples of the polyol include a diol and a polyhydric alcohol such as trihydric or higher alcohol.

Examples of the diol include, for example, a linear diol such as 1,3-propanediol, 1,4-butanediol, 1,5-pentanediol, 1,6-hexanediol, 1,7-heptanediol, 1,8-octanediol, 1,9-nonanediol and 1,10-decanediol; a branched diol such as 2-methyl-1,3-propanediol, 3-methyl-1,5-pentanediol, neopentyl glycol, 2-ethyl-1,6-hexanediol, 2,2-diethyl-1,3-propanediol, 2-butyl-2-ethyl-1,3-propanediol, 2-methyl-1,8-octanediol, 2,2,4-trimethyl-1,3-pentanediol and 2-ethyl-1,3-hexanediol; an alicyclic diol such as 1,3-cyclohexanediol, 1,4-cyclohexanediol and 1,4-cyclohexanedimethanol; an aromatic diol such as p-xylenediol and p-tetrachloroxylenediol; and an ether-based diol such as diethylene glycol and dipropylene glycol. One of these diols may be used alone, or two or more thereof may be used in combination.

Examples of the trihydric or higher alcohol include, for example, glycerin, trimethylolethane, trimethylolpropane, a dimer of trimethylolpropane, and pentaerythritol. One of these trihydric or higher alcohols may be used alone, or two or more thereof may be used in combination.

In an aspect of the present invention, the polycarbonate polyol having an alicyclic structure contains at least one of the above-described alicyclic diols.

As the carbonylating agent, a conventional carbonylating agent can used. Specific examples thereof include an alkylene carbonate, a dialkyl carbonate, a diallyl carbonate, and phosgene. One of these may be used alone, or two or more thereof may be used in combination. Among these, ethylene carbonate, propylene carbonate, dimethyl carbonate, diethyl carbonate, dibutyl carbonate, diphenyl carbonate, etc. are preferred.

In the polyol compound (c-1-2), the content of the polycarbonate polyol having an alicyclic structure is preferably 20 mass % or more, more preferably 50 mass % or more.

In an aspect of the present invention, the ratio of the alicyclic structure contained indicates, for example, in the case of having a cyclohexane ring in the structure, the ratio of a cyclohexane residue contained and in the case of dicyclohexylmethane, it also indicates the ratio of a cyclohexane residue contained. The cyclohexane residue indicates a structure formed by removing a hydrogen atom from the portion in which a substituent is bonded to the cyclohexane ring.

In an aspect of the present invention, the number average molecular weight of the polycarbonate polyol having an alicyclic structure is calculated using the number of hydroxyl groups that the polycarbonate polyol has in the molecule, and the hydroxyl value (mgKOH/g) of the polycarbonate polyol. For example, in the case where the number of the hydroxyl groups present in the molecule is N, the number average molecular weight can be calculated from the hydroxyl value according to the following formula:

$$\text{Number average molecular weight} = (56100 \times N)/(\text{hydroxyl value of polycarbonate polyol})$$

In the polyol compound (c-1-2), a polyol compound (hereinafter, referred to as another polyol compound) other than the polycarbonate polyol having an alicyclic structure may be contained as long as the effects of the present invention are not impaired.

Examples of the another polyol compound include, for example, an ester bond-containing polyol, a polycaprolactone polyol, a polyether polyol, a low molecular polyol, a polybutadiene polyol, and a silicone polyol.

Examples of the ester bond-containing polyol include polyester polyol, polyester polycarbonate polyol, etc.

Examples of the polyester polyol include those obtained by a direct esterification reaction and/or a transesterification reaction of a polyhydric alcohol with a polycarboxylic acid or its ester-forming derivative such as ester, anhydride or halide, in an amount less than the stoichiometric amount of the polyhydric alcohol. Examples of the polyhydric alcohol include, for example, aliphatic diols such as ethylene glycol, 1,2-propanediol, 1,3-propanediol, 2-methyl-1,3-propanediol, 2-butyl-2-ethyl-1,3-propanediol, 1,4-butanediol, neopentyl glycol, 3-methyl-2,4-pentanediol, 2,4-pentanediol, 1,5-pentanediol, 3-methyl-1,5-pentanediol, 2-methyl-2,4-pentanediol, 2,4-diethyl-1,5-pentanediol, 1,6-hexanediol, 1,7-heptanediol, 3,5-heptanediol, 1,8-octanediol, 2-methyl-1,8-octanediol, 1,9-nonanediol, 1,10-decanediol, diethylene glycol and triethylene glycol; alicyclic diols such as cyclohexanedimethanol and cyclohexanediol; and trihydric or higher alcohols such as trimethylolethane, trimethylolpropane, hexitols, pentitols, glycerin, pentaerythritol and tetramethylolpropane.

Examples of the polycarboxylic acid or its ester-forming derivative include, for example, a polycarboxylic acid, e.g., aliphatic dicarboxylic acids such as oxalic acid, malonic acid, succinic acid, glutaric acid, adipic acid, pimelic acid, suberic acid, azelaic acid, sebacic acid, dodecanedioic acid, 2-methylsuccinic acid, 2-methyladipic acid, 3-methyladipic acid, 3-methylpentanedioic acid, 2-methyloctanedioic acid, 3,8-dimethyldecanedioic acid, 3,7-dimethyldecanedioic acid, hydrogenated dimer acid and dimer acid, aromatic dicarboxylic acids such as phthalic acid, terephthalic acid, isophthalic acid and naphthalenedicarboxylic acid, alicyclic dicarboxylic acids such as 1,2-cyclopentanedicarboxylic acid, 1,3-cyclopentanedicarboxylic acid, 1,2-cyclohexanedicarboxylic acid, 1,3-cyclohexanedicarboxylic acid, 1,4-cyclohexanedicarboxylic acid, 1,4-dicarboxylmethylenecyclohexane, nadic acid and methylnadic acid, and tricarboxylic acids such as trimellitic acid, trimesic acid and trimer of castor oil fatty acid; acid anhydride of these polycarboxylic acids; halides, such as chloride and bromide, of the polycarboxylic acids; lower esters, such as methyl ester, ethyl ester, propyl ester, isopropyl ester, butyl ester, isobutyl ester and amyl ester, of the polycarboxylic acids; and lactones such as γ-caprolactone, δ-caprolactone, ε-caprolactone, dimethyl-ε-caprolactone, δ-valerolactone, γ-valerolactone and γ-butyrolactone.

Examples of the polycaprolactone polyol include, for example, a ring-opened polymer of caprolactone, such as polycaprolactone diol.

Examples of the low molecular polyol include, for example, a polyhydric alcohol exemplified in the polyester polyol.

Examples of the polyether polyol include, for example, an ethylene oxide and/or propylene oxide adduct of the above-described low molecular polyol, and a polytetramethylene glycol.

Examples of the silicone polyol include, for example, hydroxyl group-terminated silicone oils having a siloxane bond in the molecule.

[Acidic Group-Containing Polyol Compound (c-1-3)]

The acidic group-containing polyol compound (c-1-3) is a polyol compound having at least one acidic group in the molecule. The acidic group is not particularly limited, but examples thereof includes a carboxy group, a sulfonyl group, a phosphoric acid group, a phenolic hydroxyl group, etc. Among them, a carboxyl group-containing polyol, particularly, a carboxyl group-containing diol may be suitably used.

The carboxyl group-containing diol may be used for introducing a hydrophilic group into the polyurethane molecule, and specific examples thereof include dimethylolpropionic acid, dimethylolbutanoic acid, dimethylolbutyric acid, and dimethylolvaleric acid.

[Chain Extender (c-2) Having Reactivity with Polyurethane Prepolymer (c-1)]

The chain extender (c-2) is preferably a compound containing, in the molecule, two or more active hydrogen groups each having reactivity with an isocyanate group of the polyurethane prepolymer (c-1).

Examples of the chain extender (c-2) include, for example, a diamine compound and a polyol compound. One chain extender may be used alone, or two or more chain extenders may be used in combination.

The diamine compound is not particularly limited, and one of well-known general diamine compounds may be used alone, or two or more thereof may be used in combination. Examples of the diamine compound include low molecular diamines that are a compound obtained by substituting an alcoholic hydroxy group in the above-exemplified low molecular diol with an amino group, such as ethylenediamine and propylenediamine; polyether diamines such as polyoxypropylene diamine and polyoxyethylene diamine; alicyclic diamines such as menthanediamine, isophoronediamine, norbornenediamine, bis(4-amino-3-methyldicyclohexyl)methane, diaminodicyclohexylmethane, bis(aminomethyl)cyclohexane and 3,9-bis(3-aminopropyl)2,4,8,10-tetraoxaspiro(5,5)undecane; aromatic diamines such as m-xylenediamine, α-(m/p aminophenyl)ethylamine, m-phenylenediamine, diaminodiphenylmethane, diaminodiphenylsulfone, diaminodiethyldimethyldiphenylmethane, diaminodiethyldiphenylmethane, dimethylthiotoluenediamine, diethyltoluenediamine and α,α'-bis(4-aminophenyl)-p-diisopropylbenzene; hydrazine; and a dicarboxylic acid dihydrazide compound that is a compound formed from hydrazine and a dicarboxylic acid exemplified in the polycarboxylic acid used for the polyester polyols. Among these diamine compounds, low molecular diamines are preferred in view of handleability and workability, and ethylenediamine is more preferred.

Examples of the polyol compound include ethylene glycol, propylene glycol, 1,4-butanediol, 1,6-hexanediol, 1,4-cyclohexanediol, 1,4-cyclohexanedimethanol, 1,3-cyclohexanedimethanol, trimethylolpropane, pentaerythritol, etc.

In the aqueous urethane resin (c), in addition to the components described above, an internal branching agent and an internal crosslinking agent for imparting a branched or crosslinked structure to the polyurethane molecule may be used. As for such internal branching agent and internal crosslinking agent, a trihydric or higher polyol can be preferably used, and examples thereof include trimethylolpropane.

In the case where the aqueous urethane resin (c) has an acid group, for dispersing it in water, from the viewpoint of enhancing water dispersibility, neutralization with a neutralizer is preferably performed to facilitate mixing and dispersion in water.

Examples of the neutralizer include, for example, a hydroxide of an alkali metal or an alkaline earth metal, such as sodium hydroxide, potassium hydroxide, lithium hydroxide, calcium hydroxide and barium hydroxide; ammonia; a primary monoamine compound such as ethylamine, propylamine, butylamine, cyclohexylamine, monoethanolamine, isopropanolamine, neopentanolamine, 2-aminopropanol, 3-aminopropanol and 2-amino-2-methylpropanol; a secondary monoamine compound such as diethylamine, dibutylamine, diethanolamine, dipropylamine, diisopropanolamine, N-methylethanolamine, N-ethylethanolamine and N-methylisopropanolamine; a tertiary monoamine compound such as triethylamine, tributylamine, dimethylethanolamine, diethylethanolamine, methyldiethanolamine, dimethylaminoethanol and triethanolamine; a polyamine compound such as ethylenediamine, diethylenetriamine, hydroxyethylaminoethylamine, ethylaminoethylamine and methylaminopropylamine; pyridine; and morpholine.

Among these, a primary monoamine compound, a secondary monoamine compound, a tertiary monoamine compound, and a polyamine compound are preferably used.

As to the method for producing the aqueous urethane resin (c), the resin is obtained by reacting a polyisocyanate compound (c-1-1), a polyol compound (c-1-2) containing a polycarbonate polyol having an alicyclic structure, and an acidic group-containing polyol compound (c-1-3) to obtain a polyurethane prepolymer (c-1), and reacting the polyurethane prepolymer (c-1) with a chain extender (c-2).

Examples of the production method include, for example, (i) a method of synthesizing, in a solvent, a polyurethane prepolymer (c-1) from a polyisocyanate compound (c-1-1), a polyol compound (c-1-2) containing a polycarbonate polyol having an alicyclic structure, and an acidic group-containing polyol compound (c-1-3), and reacting, in water, the prepolymer with a chain extender (c-2), and (ii) a method of synthesizing a polymer from a polyisocyanate compound (c-1-1), a polyol compound (c-1-2) containing a polycarbonate polyol having an alicyclic structure, an acidic group-containing polyol compound (c-1-3), and a chain extender (c-2), and feeding and dispersing the polymer into water. If desired, the neutralizer component used may be previously added to water into which the polymer is fed, or may be added after feeding the polymer.

The temperature of the reaction of the polyurethane prepolymer (c-1) with a chain extender (c-2) is, for example, from 0 to 50° C., preferably from 0 to 40° C., and the reaction time is, for example, from 0.1 to 5 hours, preferably from 0.2 to 3 hours.

As the solvent being inert for reaction and having high affinity for water, which is used in the above-described preferable production method, examples thereof include, for example, acetone, methyl ethyl ketone, dioxane, tetrahydrofuran, and N-methyl-2-pyrrolidone. Such a solvent may be usually used in an amount of 3 to 100 mass %, relative to the total amount of the raw materials used for the production of a prepolymer or a polymer.

In the production method above, the blending ratio is not particularly limited. The blending ratio can be replaced by the molar ratio between isocyanate groups in the polyisocyanate component at the reaction stage and isocyanate-reactive groups in the polyol component and the chain extender. The molar ratio is preferably such that the isocyanate-reactive group is from 0.5 to 2.0 relative to the isocyanate group which is assumed to be 1, because if the dispersed urethane resin particle (polyurethane molecule) lacks an unreacted isocyanate group, use as a coating composition may lead to the reduction in the coating film adherence and the coating film strength, whereas if the unreacted isocyanate group is present excessively, this may affect dispersion stability or physical properties of the coating composition. In addition, the molar ratio of the isocyanate-reactive group in the polyol component is preferably from 0.3 to 1.0, more preferably from 0.5 to 0.9, relative to the isocyanate group in the polyisocyanate component, which is assumed to be 1. Furthermore, the molar ratio of the isocyanate-reactive group in the amine component used according to need is preferably from 0.1 to 1.0, more preferably from 0.2 to 0.5, relative to the isocyanate group in the polyisocyanate component, which is assumed to be 1.

The rate of neutralization by the neutralizer used according to need is preferably controlled to the range giving sufficient dispersion stability to the obtained aqueous urethane resin (c). The neutralization rate is preferably from 0.5 to 2.0 times equivalent, more preferably from 0.7 to 1.5 times equivalent, relative to the number of moles of the carboxyl group in the aqueous urethane resin (c), which is assumed to be 1.

In order to enhance the dispersibility of the aqueous urethane resin (c), an emulsifier such as surfactant may also be used.

As the emulsifier, an anionic surfactant, a nonionic surfactant, a cationic surfactant, an amphoteric surfactant, a high molecular surfactant, a reactive surfactant, etc., which are a well-known general surfactant and used for the urethane resin emulsion, may be used. Among these, anionic emulsifiers and nonionic emulsifiers exemplified in the acrylic resin particle (A1) can be suitably used as well.

In the aqueous dispersion of the aqueous urethane resin (c), the solid content thereof is not particularly limited but is preferably from 25 to 55 mass %, more preferably from 30 to 50 mass %.

The average particle diameter of the aqueous urethane resin (c) is not particularly limited but is preferably 1 μm or less, more preferably 500 nm or less, in view of the finish appearance and the storage stability of coating composition.

The average particle diameter (hereinafter, sometimes referred to as particle diameter") can be measured using a general measuring means such as laser light scattering.

In the present specification, the average particle diameter of the resin particle is a value measured by a submicron particle size analyzer at 20° C. after diluting the resin particle with deionized water in the usual manner. As the submicron particle size analyzer, for example, "COULTER Type N4" (trade name, manufactured by Beckman Coulter Inc.) can be used.

[Aqueous Urethane Resin Dispersion]

As the aqueous medium in which a urethane resin obtained by reacting the polyurethane prepolymer (c-1) with a chain extender (c-2) is dispersed, examples thereof include, for example, water and a mixed medium of water and a hydrophilic organic solvent. Examples of water include, for example, clean water, ion-exchanged water, distilled water, and ultrapure water. Among them, in view of availability and in order to prevent particles from becoming unstable due to the effect of salt, ion-exchanged water is preferably used. Examples of the hydrophilic organic solvent include, for example, a lower monohydric alcohol such as methanol, ethanol and propanol; a polyhydric alcohol such as ethylene glycol and glycerin; and an aprotic hydrophilic organic solvent such as N-methylmorpholine, dimethylsulfoxide, dimethylformamide and N-methylpyrrolidone. The amount of the hydrophilic organic solvent in the aqueous medium is preferably 20 mass % or less.

The ratio of the alicyclic structure contained in the aqueous urethane resin (c) in an aspect of the present invention is, on the solid content basis, from 45 to 65 mass %, preferably from 45 to 60 mass %, more preferably from 45 to 55 mass %. The solid content corresponds to the matter remaining after removing aqueous and organic solvents from the aqueous urethane resin dispersion.

The ratio of the alicyclic structure contained is a value obtained by calculating the molar concentration (mol/g) of the alicyclic structure from the charge ratio of respective raw materials of the aqueous urethane resin and converting it to the mass fraction. If the ratio of the alicyclic structure contained is less than 45 mass %, the storage stability and the finish property may be reduced, and if the ratio of the alicyclic structure exceeds 65 mass %, the dispersibility of the aqueous polyurethane resin dispersion may be deteriorated, the median diameter of particles may become large, or gelling may occur.

<<Melamine Resin (d)>>

Examples of the melamine resin (d) include, for example, a methylolmelamine such as dimethylolmelamine, trimethylolmelamine, tetramethylolmelamine, pentamethylolmelamine and hexamethylolmelamine; an alkyl-etherified product of a methylolmelamine with an alcohol; and an etherified product of a methylolmelamine condensate with an alcohol. Examples of the alcohol include, for example, a $C_{1-10}$ alkanol such as methyl alcohol, ethyl alcohol, propyl alcohol, isopropyl alcohol, butyl alcohol, isobutyl alcohol and 2-ethylhexyl alcohol.

In addition, as the melamine resin (d), for example, a melamine resin having, on average, at least three methyl-etherified methylol groups per one triazine nucleus; and a hydrophilic imino group-containing alkyl-etherified melamine resin having a weight average molecular weight of about 500 to about 1,000, may be suitably used.

As the melamine resin (d), a commercially available product may be used, and examples of the commercially available product include, for example, "CYMEL 303", "CYMEL 323", "CYMEL 325", "CYMEL 327", "CYMEL 350", "CYMEL 370", "CYMEL 380", "CYMEL 385", "CYMEL 212", "CYMEL 253", and "CYMEL 254" (trade names, all produced by Nippon Cytec Industries, Inc.); "RESIMENE 735", "RESIMENE 740", "RESIMENE 741", "RESIMENE 745", "RESIMENE 746" and "RESIMENE 747" (trade names, all produced by Monsanto Chemical Co.); "SUMIMAL M55", "SUMIMAL M30W" and "SUMIMAL M50W" (trade names, all produced by Sumitomo Chemical Co., Ltd.); and "U-VAN 20SE" (trade name, produced by Mitsui Chemicals Inc.).

Furthermore, as the curing catalyst of the melamine resin, a sulfonic acid such as p-toluenesulfonic acid, dodecylbenzenesulfonic acid and dinonylnaphthalenesulfonic acid: a salt formed by neutralization of the sulfonic acid with an amine; a salt formed by neutralization of a phosphoric acid ester compound with an amine; etc. may be used.

In the aqueous first base coating composition (A), in view of smoothness, distinctness of image, chipping resistance, hardness, etc. of the obtained multilayer coating film, the blending ratio of the aqueous polyester resin (a), aqueous acrylic resin (b), aqueous urethane resin (c) and melamine resin (d) is preferably in the following range, based on 100 parts by mass of the total resin solid content of the aqueous polyester resin (a), aqueous acrylic resin (b), aqueous urethane resin (c) and melamine resin (d).

Aqueous polyester resin (a): from 15 to 35 parts, preferably from 20 to 30 parts Aqueous acrylic resin (b): from 15 to 30 parts, preferably from 20 to 25 parts Aqueous urethane resin (c): from 15 to 30 parts, preferably from 20 to 25 parts Melamine resin (d): from 15 to 35 parts, preferably from 20 to 30 parts The aqueous first base coating composition (A) can be prepared by uniformly mixing the above-described aqueous polyester resin (a), aqueous acrylic resin (b), aqueous urethane resin (c) and melamine resin (d) in an aqueous solvent by normal means for forming a coating composition.

As the aqueous solvent, deionized water or a mixture of deionized water and a hydrophilic organic solvent may be used. Examples of the hydrophilic organic solvent include, for example, propylene glycol monomethyl ether.

In the aqueous first base coating composition (A), an additive for coating composition, such as pigment, curing catalyst, thickener, organic solvent, basic neutralizer, UV absorber, light stabilizer, surface conditioner, antioxidant, and silane coupling agent, may be further blended, if desired.

Examples of the pigment include, for example, a coloring pigment and an extender pigment. Examples of the coloring pigment include, for example, a white pigment such as titanium oxide and zinc oxide; a black pigment such as carbon black, acetylene black, lamp black, bone black, graphite, iron black and aniline black; a yellow pigment such as yellow iron oxide, titanium yellow, chrome yellow, chromium oxide, monoazo yellow, condensed azo yellow, azomethine yellow, bismuth vanadate, benzimidazolone, isoindolinone, isoindoline, quinophthalone, benzidine yellow and permanent yellow; an orange pigment such as permanent orange; a red pigment such as red iron oxide, cadmium red, molybdenum red, naphthol AS azo red, anthanthrone, anthraquinonyl red, perylene maroon, quinacridone red pigment, diketopyrrolopyrrole, watching red and permanent red; a violet pigment such as cobalt violet, quinacridone violet and dioxazine violet; a blue pigment such as cobalt blue, Prussian Blue, phthalocyanine blue and threne Blue; a green pigment such as phthalocyanine green; and other azo pigments, phthalocyanine pigments, quinacridone pigments, isoindoline pigments, threne pigments and perylene pigments. Examples of the extender pigment include, for example, barium sulfate, barium carbonate, calcium carbonate, aluminum silicate, gypsum, clay, silica, white carbon, diatomite, talc, magnesium carbonate, alumina white, gloss white and mica powder.

One of these pigments may be used alone, or two or more thereof may be used in combination. Among them, in view of chipping resistance of the obtained multilayer coating film, titanium oxide, barium sulfate and talc are preferably used.

The used amount of the pigment may vary depending on the kind of the pigment but is preferably in the range of usually from about 20 to about 120 parts by mass, per 100 parts by mass of the total resin solid content of the aqueous polyester resin (a), aqueous acrylic resin (b), aqueous urethane resin (c) and melamine resin (d) in the aqueous first base coating composition (A).

Examples of the curing catalyst include, for example, an organic metal compound, an acid compound, and a base compound. Examples of the organic metal compound include, for example, a metal catalyst such as tetraisopropyl titanate, tetrabutyl titanate, lithium acetate, iron(III) acetylacetonate, zinc 2-ethylhexanoate, copper acetate, vanadium trichloride, tin octylate, dibutyltin diacetate, dibutyltin dioctoate, dibutyltin dilaurate, dibutyltin dimaleate, tetrabutyltin, dibutyltin oxide, tetra-n-butyl-1,3-diacetyloxydistannoxane, tetra-n-propyl-1,3-diacetyloxydistannoxane and tetra-n-butyl-1,3-dilauryloxydistannoxane. In particular, an organotin compound such as tin octylate, dibutyltin diacetate, dibutyltin dilaurate and distannoxane is preferred. Furthermore, in the case where low-temperature baking is required, dibutyltin diacetate is suitably used. Examples of the acid compound include, for example, p-toluenesulfonic acid, dodecylbenzenesulfonic acid, dinonylnaphthalenesulfonic acid, dinonylnaphthalenedisulfonic acid, butylphosphoric acid, and octylphosphoric acid. An amine neutralized product of such an acid is also suitably used. Examples of the base compound include, for example, trimethylamine, triethylamine, dimethylcyclohexylamine, N-tetramethylhexane-1,6-diamine, N-pentamethyldiethylenetriamine, 2-methyl-1,4-diazabicyclo[2,2,2]octane, and other compounds.

One of these compounds recited above as a curing catalyst may be used alone, or two or more thereof may be used in combination. The used amount of the curing catalyst may vary depending on the kind of the catalyst but is preferably in the range of usually from about 0.05 to about 5 parts by mass, based on 100 parts by mass of the total resin solid content of the aqueous polyester resin (a), aqueous acrylic resin (b), aqueous urethane resin (c) and melamine resin (d) in the aqueous first base coating composition (A).

Examples of the thickener include, for example, an inorganic thickener such as silicate, metal silicate, montmorillonite, organic montmorillonite and colloidal alumina; a polyacrylic acid-based thickener such as sodium polyacrylate and polyacrylic acid-(meth)acrylic acid ester copolymer (examples of the commercial product include "PRIMAL ASE-60" produced by Rohm and Haas Company, etc.); a urethane associative thickener having a urethane bond and a polyether chain per molecule and effectively exhibiting a thickening action by association of the urethane bonds with each other in an aqueous medium (examples of the commercial product include, for example, "UH-814N", "UH-462", "UH-420", "UH-472" and "UH-540" (all trade names) produced by ADEKA Corp., and "SN Thickener 612", "SN Thickener 621N", "SN Thickener 625N" and "SN Thickener 627N" (all trade names) produced by San Nopco Limited); a cellulose derivative-based thickener such as carboxymethyl cellulose, methyl cellulose and hydroxyethyl cellulose; a protein-based thickener such as casein, sodium caseinate and ammonium caseinate; an alginic acid-based thickener such as sodium alginate; a polyvinyl-based thickener such as polyvinyl alcohol, polyvinylpyrrolidone and polyvinyl benzyl ether copolymer; a polyether-based thickener such as pluronic polyether, polyether dialkyl ester, polyether dialkyl ether and polyether epoxy-modified product; a maleic anhydride copolymer-based thickener such as partial ester of vinyl methyl ether-maleic anhydride copolymer; and a polyamide-based thickener such as polyamide amine salt. Among them, a polyacrylic acid-based thickener and/or a urethane associative thickener are preferably used, and a urethane associative thickener is more preferably used. One of these thickeners may be used alone, or two or more thereof may be used in combination. In the case of using the thickener, the used amount thereof is preferably in the range of usually from 0.1 to about 10 parts by mass, more preferably from 0.5 to 8 parts by mass, further preferably from 1 to 5 parts by mass, based on 100 parts by mass of the total solid content of the aqueous polyester resin (a), aqueous acrylic resin (b), aqueous urethane resin (c) and melamine resin (d) in the aqueous first base coating composition (A).

As the UV absorber, an absorber that is known per se may be used, and examples thereof include a benzotriazole-based absorber, a triazine-based absorber, a salicylic acid derivative-based absorber, and a benzophenone-based absorber. In the case of using such a UV absorber, in view of weatherability, yellowing resistance, etc. of the obtained multilayer coating film, the used amount of the absorber is preferably in the range of usually from about 0.1 to 10 parts by mass, more preferably from 0.2 to 5 parts by mass, further preferably from 0.3 to 2 parts by mass, based on 100 parts by mass of the total resin solid content of the aqueous polyester resin (a), aqueous acrylic resin (b), aqueous urethane resin (c) and melamine resin (d) in the aqueous first base coating composition (A).

As the light stabilizer, a light stabilizer that is known per se may be used, and examples thereof include a hindered amine-based light stabilizer. In the case of using the light stabilizer, in view of weatherability, yellowing resistance, etc. of the obtained multilayer coating film, the used amount of the light stabilizer is preferably in the range of usually from about 0.1 to 10 parts by mass, more preferably from 0.2 to 5 parts by mass, further preferably from 0.3 to 2 parts by mass, based on 100 parts by mass of the total resin solid content of the aqueous polyester resin (a), aqueous acrylic resin (b), aqueous urethane resin (c) and melamine resin (d) in the aqueous first base coating composition (A).

The aqueous first base coating composition (A) may be applied onto the cured electrodeposition coating film described above by a method that is known per se, for example, by air spray coating, airless spray coating, rotary atomization coating or curtain-coat coating, and during coating, an electrostatic charge may be applied. Among these, a method such as air spray coating and rotary atomization coating is preferred.

In view of smoothness, distinctness of image, chipping resistance, hardness, etc. of the obtained multilayer coating film, the amount of the aqueous first base coating composition (A) coated is preferably an amount giving a cured film thickness of generally from 15 to 35 μm, more preferably from 20 to 30 μm.

In an aspect of the present invention, the breaking energy at 20° C. of the coating film formed of the aqueous first base coating composition (A) is 0.6 kgf·mm or more. The breaking energy indicates the energy (amount of work) required to break the coating film. When the breaking energy is 0.6 kgf·mm or more, the impact resistance of the multilayer coating film is excellent. The breaking energy is preferably from 0.6 to 3.0 kgf·mm, more preferably from 1.0 to 2.5 kgf·mm.

The breaking energy above is a value measured for a cured coating film that is cured by heating under the condition of keeping a 50 μm-thick aqueous first base coating film at 140° C. for 18 minutes.

The breaking energy can be determined by preparing a curve (stress-strain curve) graphically depicting the relationship between normal stress (stress) and normal strain (strain) at a tensile test and calculating an integrated value of stress from the starting point of the tensile test to the breaking point while using the strain as a variable. More specifically, this value is the result when an aqueous first base coating composition is applied onto a glass plate to have a thickness of 50 μm in terms of the cured coating film, cured by heating under the condition of keeping the coating film at 140° C. for 18 minutes, peeled off from the glass plate, cut into a strip of 20 mm in length and 5 mm in width, and measured at 20° C. at a tensile speed of 4 mm/min in the longitudinal direction by means of "Tensilon UTM-II-20" (trade name, manufactured by Orientec Co., Ltd.).

(Step (2))

Onto the uncured coating film of the aqueous first base coating composition (A) formed in the step (1), an aqueous second base coating composition (B) is subsequently applied without preheating, to form a second base coating film (BC2) giving a cured film thickness of 8 to 18 μm.

<Aqueous Second Base Coating Composition (B)>

The aqueous second base coating composition (B) is a coating composition used with the purpose of generally imparting excellent appearance to an object to be coated and, for example, a coating composition that is known per se and is usually used for the coating of an automotive body can be used. As the aqueous second base coating composition (B), for example, a coating composition formed by dissolving or dispersing a resin component composed of a base resin having a crosslinking functional group such as carboxyl group or hydroxyl group, such as acrylic resin, polyester resin, alkyd resin, urethane resin or epoxy resin, and a curing agent, such as polyisocyanate compound that may be blocked, melamine resin and urea resin, in an aqueous medium together with a pigment and other additives, may be used.

As the pigment, a coloring pigment, an effect pigment, etc. can be used. Examples of the coloring pigment include, for example, titanium oxide, zinc oxide, carbon black, molybdenum red, Prussian blue, cobalt blue, an azo-based pigment, a phthalocyanine-based pigment, a quinacridone-based pigment, an iso indoline-based pigment, a threne (anthraquinone)-based pigment, a perylene-based pigment, a dioxazine-based pigment, and a diketopyrrolopyrrole-based pigment, and one of these may be used alone, or two or more thereof may be used in combination. Examples of the effect pigment include, for example, aluminum (including evaporated aluminum), copper, zinc, brass, nickel, aluminum oxide, mica, titanium oxide-coated aluminum oxide, iron oxide-coated aluminum oxide, titanium oxide-coated mica, iron oxide-coated mica, glass flake, and a holographic pigment, and one of these effect pigments may be used alone, or two or more thereof may be used in combination. The effect pigment is preferably scaly. In addition, an effect pigment having a longitudinal dimension of generally from 1 to 100 μm, more preferably from 5 to 40 μm, and a thickness of generally from 0.001 to 5 μm, more preferably from 0.01 to 2 μm, is suited.

The aqueous second base coating composition (B) may further contain, if desired, a general additive for coating composition, such as curing catalyst, thickener, UV absorber, light stabilizer, antifoaming agent, plasticizer, organic solvent, surface conditioner and antisettling agent. One of these additives for coating composition may be used alone, or two or more thereof may be used in combination.

The aqueous second base coating composition (B) may be applied onto the uncured first base coating film by the method that is known per se, such as air spraying, airless spraying, rotary atomization coating and curtain-coat coating, and during coating, an electrostatic charge may be applied. Among these methods, air spray coating, rotary atomization coating, etc. are preferred.

In view of smoothness, distinctness of image, etc. of the obtained multilayer coating film, the amount of the aqueous second base coating composition (B) coated is preferably an amount giving a cured film thickness of 8 to 18 μm, more preferably from 10 to 15 μm. In particular, in the case where the aqueous second base coating composition (B) contains an effect pigment, when the amount coated falls within the range above, the effect pigment is oriented in the second base coating film, making it possible to obtain an appearance having an excellent design property giving a feeling of glittering luster or optical interference.

After the application of the aqueous second base coating composition (B), it is preferable to perform preheating, air blowing, etc., if desired, under the heating conditions causing substantially no curing of the coating film. The preheating temperature is in the range of usually from about 40° C. to about 100° C., preferably from about 50° C. to about 90° C., more preferably from about 60° C. to about 80° C., and the preheating time is in the range of usually from 30 seconds to 15 minutes, preferably from 1 to 10 minutes, more preferably from 2 to 5 minutes.

In the method for forming a multilayer coating film in an aspect of the present invention, in view of smoothness, distinctness of image, design property, etc. of the obtained multilayer coating film, in the step (2), the aqueous second base coating composition (B) is preferably applied by two-stage application.

In general, in the automotive body coating line, the coating application is usually divided into respective zones each using the same kind of coating composition, and the coating quality is thereby prevented from degradation due to, e.g., attachment of a scattered coating composition to the object to be coated or coating film. For example, the automobile coating line is generally divided into respective zones of undercoating zone, intermediate coating zone, base coating zone and clear coating zone. In each of these coating zones, the coating application is usually divided into two or more stages, and there is taken a measure of providing a setting time of approximately from 30 seconds to 3 minutes between respective coating applications (stages) so as to prevent sagging, etc. of the coating composition and achieve high coating quality. Respective coating applications within the same zone are referred to, in temporal order, from earliest to latest, as a first stage, a second stage . . . an X-th stage.

Such a coating application method is generally referred to as multistage application and is called, for example, a 2-stage application when the coating application within the same zone is performed divisionally in two stages, or a 3-stage application when performed in three stages.

In the method for forming a multilayer coating film in an aspect of the present invention, in the case of applying the aqueous second base coating composition (B) in the base coating zone, the coating application in the step (2) is preferably performed by 2-stage application in view of coating appearance, application efficiency, etc.

In addition, in view of energy saving, productivity enhancement, etc., with respect to the above-described two-stage application, it is preferable to provide, without performing preheating, an interval of about 30 seconds to about 3 minutes between the end of application in the first stage and the start of application in the second stage.

In the two-stage application, in view of a glitter feeling, etc. of the obtained multilayer coating film, the coating composition solid content of the aqueous second base coating composition (B) is in the range of preferably from 15 to 40 mass %, more preferably from 20 to 35 mass %.

After a second base coating film is formed by the above-described two-stage application, preheating is preferably performed as needed at a temperature causing substantially no curing of the coating film. The preheating temperature is a temperature in the range of usually from about 40° C. to about 100° C., preferably from about 50° C. to about 90° C., more preferably from about 60° C. to about 80° C., and the preheating time is in the range of usually from 30 seconds to 15 minutes, preferably from 1 to 10 minutes, more preferably from 2 to 5 minutes.

(Step (3))

Onto the uncured second base coating film formed in the step (2), a clear coating composition (C) is further applied to form a clear coating film giving a cured coating film thickness of 25 to 50 μm.

<Clear Coating Composition (C)>

As the clear coating composition (C) for use in the method for forming a multilayer coating film in an aspect of the present invention, any thermosetting clear coating composition that is known per se for the coating of an automotive body, etc., can be used. Examples of the thermosetting clear coating composition include, for example, an organic solvent-type thermosetting coating composition, an aqueous thermosetting coating composition, and a thermosetting powder coating composition, each containing a crosslinking functional group-containing base resin and a crosslinking agent.

Examples of the base resin include, for example, an acrylic resin, a polyester resin, an alkyd resin, a urethane resin, an epoxy resin, and a fluororesin, each having a crosslinking functional group. Examples of the crosslinking agent include, for example, a polyisocyanate compound, a blocked polyisocyanate compound, a melamine resin, a urea resin, a carboxyl group-containing compound, a carboxyl group-containing resin, an epoxy group-containing resin, and an epoxy group-containing compound.

Examples of the combination of base resin/curing agent in the clear coating composition (C) include, for example, carboxyl group-containing resin/epoxy group-containing resin, hydroxyl group-containing resin/polyisocyanate compound, hydroxyl group-containing resin/blocked polyisocyanate compound, and hydroxyl group-containing resin/melamine resin. Among them, in view of distinctness of image and coating film hardness, a combination of carboxyl group-containing resin/epoxy group-containing resin (hereinafter, sometimes simply referred to as "acid/epoxy-curable clear coating composition"), and a combination of hydroxyl group-containing resin/melamine resin (hereinafter, sometimes simply referred to as "melamine-curable clear coating composition") are preferred.

The clear coating composition (C) may be a one-component coating composition or a multi-component coating composition such as two-component urethane resin coating composition, but in view of working life, a one-component coating composition is preferably used.

In the clear coating composition (C), if desired, a pigment, a curing catalyst, a UV absorber, a light stabilizer, a surface conditioner, an antioxidant, antifoaming agent, a fluidity conditioner, etc. may further be appropriately blended to an extent not impairing the transparency.

The clear coating composition (C) can be applied onto the second base coating film by a method that is known per se, such as air spraying, airless spraying, rotary atomization coating and curtain-coat coating, and during coating, an electrostatic charge may be applied. Among these methods, air spray coating, rotary atomization coating, etc. are preferred.

In view of smoothness, distinctness of image, weatherability, etc. of the obtained multilayer coating film, the amount of the clear coating composition (C) coated is an amount giving a cured film thickness of 25 to 50 μm, preferably from 35 to 45 μm.

After the application of the clear coating composition (C), if desired, an interval of approximately from 1 to 60 minutes may be provided at room temperature.

(Step (4))

In the method for forming a multilayer coating film in an aspect of the present invention, three coating film layers of uncured first base coating film, uncured second base coating film and uncured clear coating film, which are formed in the steps (1) to (3), are simultaneously cured by heating.

Curing of the first base coating film, second base coating film and clear coating film can be performed by an ordinary coating film-baking means, for example, by hot-air heating, infrared heating or high-frequency heating. The heating temperature is a temperature in the range of usually from about 80° C. to about 160° C., preferably from about 100° C. to about 140° C. The heating time is in the range of usually from 10 to 60 minutes, preferably from 15 to 40 minutes. By this heating, the multilayer coating film composed of three layers of first base coating film, second base coating film and clear coating film can be cured simultaneously.

In the multilayer coating film obtained by the method in an aspect of the present invention, the peel strength at the coating film interface of the cured electrodeposition coating film and the first base coating film is 0.4 kN/m or more, preferably from 0.4 to 3.0 kN/m, more preferably from 0.6 to 2.0 kN/m. When the peel strength at the coating film interface of the cured electrodeposition coating film and the first base coating film is 0.4 kN/m or more, good adhesion between coating films can be ensured.

The measurement of peel strength at the coating film interface of the cured electrodeposition coating film and the first base coating film can be performed based on the surface-interfacial cutting method (SAICAS method). Here, "SAICAS" stands for Surface And Interfacial Cutting Analysis System. By this SAICAS method, the peel strength and shear strength of the coating film for an adherend can be measured. The SAICAS method is described, for example, in Itsuo NISHIYAMA, "Adhesive strength evaluation of adherend by SAICAS method (1)", Coating Technology, 34, 4, 123 (1995), and Itsuo NISHIYAMA, "Adhesive strength evaluation of adherend by SAICAS method (2)", Coating Technology, 34, 5, 129 (1995), and is a known measuring method.

In the measurement by SAICAS method, the first base coating film is cut from the surface by moving a blade that is bent at a predetermined rake angle, in the horizontal direction relative to the coating film surface while pressing the blade with a predetermined load and after the blade reaches the coating film interface, the blade is moved only in the horizontal direction to measure the horizontal cutting stress. The interlayer bond strength is calculated in accordance with the following formula:

$$P=FH/w$$

wherein P: interlayer bond strength (N/m), FH: horizontal cutting stress (N), w: blade width (m) of the blade.

In the multilayer coating film obtained by the method in an aspect of the present invention, the melamine migration rate, in an infrared absorption spectrum, that is a value obtained by dividing the peak height ratio of a composite film composed of the first base coating film and the second base coating film by the peak height ratio of a single film of the first base coating film, is preferably from 0 to 25%. When the melamine migration rate falls within the range above, this is effective for chipping resistance. The melamine migration rate is more preferably from 0 to 23%, still more preferably from 0 to 22%, yet still more preferably from 0 to 20%.

Here, the ratio of the peak height of the composite film to the peak height of a single film of the first base coating film is a ratio between an infrared absorption peak height of ester group at 1,725 $cm^{-1}$ and an infrared absorption peak height of melamine resin at 814 $cm^{-1}$.

EXAMPLES

The present invention is described more specifically below by referring to Examples, but the scope of the present invention is not limited only to these Examples. In Examples, "parts" and "%" indicate "parts by mass" and "mass %", respectively.

Preparation of Aqueous First Base Coating Composition (A)

Production of Aqueous Polyester Resin (a)

Production Example 1

Into a reaction vessel equipped with a thermometer, a thermostat, a stirring device, a reflux condenser and a water separator, 193 parts of hexahydrophthalic anhydride, 208 parts of isophthalic acid, 183 parts of adipic acid, 376 parts of neopentyl glycol and 122 parts of trimethylolpropane were charged, and the temperature was raised from 160° C. to 230° C. over 3 hours. While distilling off the produced water via the water separator and keeping the temperature at 230° C., a condensation reaction was allowed to proceed until the acid value reached 3 mgKOH/g or less. Subsequently, in order to add a carboxyl group to the obtained condensation reaction product, 30 parts of trimellitic anhydride was further added thereto and after allowing the reaction to proceed at 170° C. for 30 minutes, the reaction product was cooled to 60° C. or less, neutralized by adding 0.9 equivalents of 2-(dimethylamino)ethanol relative to the acid group, and then, deionized water was gradually added to obtain Aqueous Polyester Resin (a1) having a hydroxyl value of 125 mgKOH/g, an acid value of 21 mgKOH/g, a number average molecular weight of 1,300, a solid content of 45%, and a pH of 7.5.

Production Examples 2 to 4

Aqueous Polyester Resins (a2) to (a4) each having the hydroxyl value, acid value and number average molecular weight shown in Table 1 and having a solid content of 45% and a pH of 7.5 were obtained in the same manner as in Production Example 1 except that the blending compositions of polybasic acid component (a-1) and alcohol component (a-2) were changed as shown in Table 1 below.

TABLE 1

| Production Example | | | 1 | | 2 | | 3 | | 4 | |
|---|---|---|---|---|---|---|---|---|---|---|
| Name of aqueous polyester resin (a) | | | a1 | | a2 | | a3 | | a4 | |
| Blending amount | | | Parts by mass | Number of moles | Parts by mass | Number of moles | Parts by mass | Number of moles | Parts by mass | Number of moles |
| Polybasic acid component (a-1) | Aromatic (a-1-1) | Isophthalic acid | 208 | 1.25 | 173 | 1.04 | 158 | 0.95 | 236 | 1.42 |
| | | Trimellitic anhydride | 30 | 0.16 | 30 | 0.16 | 31 | 0.16 | 30 | 0.16 |
| | Alicyclic (a-1-2) | Hexahydrophthalic anhydride | 193 | 1.25 | 160 | 1.04 | 147 | 0.95 | 219 | 1.42 |
| | Aliphatic (a-1-3) | Adipic acid | 183 | 1.25 | 140 | 0.96 | 279 | 1.91 | 130 | 0.89 |
| Alcohol component (a-2) | | Neopentyl glycol | 376 | — | 375 | — | 382 | — | 373 | — |
| | | Trimethylolpropane | 122 | — | 122 | — | 124 | — | 121 | — |
| Characteristic value | | Acid value (mgKOH/g) | | 21 | | 21 | | 21 | | 21 |
| | | Hydroxyl value (mgKOH/g) | | 125 | | 125 | | 125 | | 125 |
| | | Number average molecular weight | | 1300 | | 1300 | | 1300 | | 1300 |
| Concentration (mol %) of polybasic acid having aromatic ring and/or aliphatic ring relative to total amount of polybasic acids | | | — | 68 | — | 70 | — | 52 | — | 77 |

Production of Aqueous Acrylic Resin (b)

Production Example 5

Into a reaction vessel equipped with a thermometer, a thermostat, a stirring device, a reflux condenser, a nitrogen inlet tube and a dropping device, 60 parts of deionized water and 0.52 parts of "AQUALON KH-10" (product name, produced by Dai-ichi Kogyo Seiyaku Co., Ltd., polyoxyethylene alkyl ether sulfate ester ammonium salt, active ingredient: 97%) were charged and mixed with stirring in a nitrogen stream, and the temperature was raised to 80° C. Subsequently, 1% of the total amount of the monomer emulsion shown below and 5 parts of an aqueous 3% ammonium persulfate solution were introduced into the reaction vessel, followed by holding them at 80° C. for 15 minutes. Thereafter, the remainder of the monomer emulsion was added dropwise to the reaction vessel held at the same temperature over 3 hours and they were aged for 1 hour after the completion of dropwise addition. Subsequently, the reaction mixture was cooled to 30° C. while gradually adding 40 parts of an aqueous 5% 2-(dimethylamino)ethanol solution to the reaction vessel and then discharged while filtering it through 100-mesh nylon cloth to obtain Aqueous Acrylic Resin (b1) that is an acrylic emulsion having a hydroxy value of 39 mgKOH/g, an acid value of 12 mgKOH/g, and a solid content of 45%.

Monomer Emulsion:

50 Parts of deionized water, 0.9 parts of "AQUALON KH-10", 10 parts of styrene, 20.5 parts of ethyl acrylate, 60 parts of n-butyl acrylate, 8 parts of 2-hydroxyethyl acrylate, and 1.5 parts of acrylic acid were mixed with stirring to obtain a monomer emulsion.

Production Examples 6 to 8

Aqueous Acrylic Resins (b2) to (b4) which are each an acrylic emulsion having the hydroxyl value and acid value shown in Table 2 and having a solid content of 45% were obtained in the same manner as in Production Example 5 except that the blending composition of monomers was changed as shown in Table 2 below.

TABLE 2

| Production Example | | 5 | 6 | 7 | 8 |
|---|---|---|---|---|---|
| Name of aqueous acrylic resin (b) | | b1 | b2 | b3 | b4 |
| Type | | Emulsion | Emulsion | Emulsion | Emulsion |
| Monomer | Styrene | 10 | 10 | 10 | 10 |
| | Ethyl acrylate | 20.5 | 35.5 | 40.5 | 10 |
| | n-Butyl acrylate | 60 | 45 | 40 | 60 |
| | 2-Hydroxyethyl acrylate | 8 | 8 | 8 | 8 |
| | Acrylic acid | 1.5 | 1.5 | 1.5 | 12 |
| Characteristic value | Hydroxyl value (mgKOH/g) | 39 | 39 | 39 | 39 |
| | Acid value (mgKOH/g) | 12 | 12 | 12 | 90 |
| Monomer concentration (mass %) | Polymerizable unsaturated monomer having alkyl group with 4 to 8 carbon atoms | 60 | 45 | 40 | 60 |
| | Hydroxyl group-containing polymerizable unsaturated monomer | 8 | 8 | 8 | 8 |
| | Carboxyl group-containing polymerizable unsaturated monomer | 1.5 | 1.5 | 1.5 | 12 |
| | Another polymerizable unsaturated monomer | 30.5 | 45.5 | 50.5 | 20 |

Production of Aqueous Urethane Resin (c)
(Urethane Resin Particle)

Production Example 9

Into a reaction vessel equipped with a thermometer, a thermostat, a stirring device and a reflux condenser, 63.1 parts of "ETERNACOLL UC-100" (trade name, produced by Ube Industries, Ltd., a polycarbonate diol obtained by the reaction of 1,4-cyclohexanedimethanol and carbonic acid ester, molecular weight: about 1,000), 3.6 parts of dimethylolpropionic acid, 4.9 parts of trimethylolpropane, 0.1 parts of "NEOSTANN U-600" (trade name, produced by Nitto Kasei Co., Ltd., bismuth-based catalyst), and 100 parts of methyl ethyl ketone solvent were charged, and after raising the temperature to 80° C. while stirring the mixture, 28.3 parts of hydrogenated MDI was added dropwise over 30 minutes. Thereafter, the reaction was allowed to proceed by keeping the temperature at 80° C. until the NCO value was reduced to 1 mg/g (relative to the solid content) or less, and the reaction product was cooled to room temperature to obtain a terminal hydroxyl group-containing urethane resin solution. The number average molecular weight of the obtained urethane resin was 5,500.

While continuing stirring, the resin viscosity was reduced with 100 parts of methyl ethyl ketone solvent, and after performing neutralization by adding 1.4 parts of dimethylethanolamine, the resin was dispersed in water (phase inversion emulsification) by appropriately adding 148.6 parts of deionized water.

Stirring was further continued, and removal of solvent under reduced pressure was performed while raising the temperature to 60° C. At the point when the methyl ethyl ketone blended was entirely distilled off, the pressure was returned to normal pressured and after cooling, deionized water over-removed by distillation was compensated to obtain an aqueous urethane resin particle dispersion having a solid content concentration by mass of 40% (Aqueous Urethane Resin (c1)).

In Aqueous Urethane Resin (c1), the ratio of the alicyclic structure contained was 50 wt %, the average particle diameter was 130 nm (as measured using a submicron particle size distribution analyzer, "COULTER Model N4" (manufactured by Beckman Coulter, Inc.) at 20° C. after dilution with deionized water), the acid value was 15 mgKOH/g, the hydroxyl value was 40 mgKOH/g, the viscosity was 190 mPa·s (B-type viscometer, 60 rpm, 23° C.), and the number average molecular weight was 5,500.

Production Examples 10 to 13

Aqueous Urethane Resins (c2) to (c5) were obtained in the same manner as in Production Example 9 except that the composition was changed as shown in Table 3 below. Respective characteristic values of each of Aqueous Urethane Resins (c2) to (c5) are shown together in Table 3 below.

TABLE 3

| Production Example | | | 9 | 10 | 11 | 12 | 13 |
|---|---|---|---|---|---|---|---|
| Name of aqueous urethane resin (c) | | | c1 | c2 | c3 | c4 | c5 |
| Urethane resin component (total: 100) | OH Component | ETERNACOLL UC-100(*1) | 63.1 | 54.1 | 59.7 | 45.1 | 25.2 |
| | | ETERNACOLL UH-100(*2) | — | 9.0 | — | 18.0 | 37.9 |
| | | Trimethylolpropane | 4.9 | 4.9 | 7.2 | 4.9 | 4.9 |
| | | Dimethylolpropionic acid | 3.6 | 3.6 | 3.6 | 3.6 | 3.6 |
| | NCO Component | Hydrogenated MDI | 28.4 | 28.4 | 29.5 | 28.4 | 28.4 |
| Ratio of alicyclic structure contained in aqueous urethane resin (mass %) | | | 50 | 45 | 48 | 40 | 30 |
| Solid content concentration of aqueous urethane resin (%) | | | 40 | 40 | 40 | 40 | 40 |
| Average particle diameter of aqueous urethane resin (nm) | | | 130 | 140 | 120 | 160 | 190 |
| Acid value of aqueous urethane resin (mgKOH/g) | | | 15 | 15 | 15 | 15 | 15 |
| Hydroxyl value of aqueous urethane resin (mgKOH/g) | | | 40 | 40 | 60 | 40 | 40 |
| Viscosity of aqueous urethane resin (mPa·s) | | | 190 | 190 | 230 | 180 | 150 |
| Number average molecular weight of aqueous urethane resin | | | 5500 | 5500 | 4000 | 5500 | 5500 |

(*1)"ETERNACOLL UC-100" (trade name, produced by Ube Industries, Ltd., a polycarbonate diol obtained by the reaction of 1,4-cyclohexanedimethanol and carbonic acid ester, molecular weight: about 1,000)
(*2)"ETERNACOLL UH-100" (trade name, produced by Ube Industries, Ltd., a polycarbonate diol obtained by the reaction of 1,6-hexanediol and carbonic acid ester, molecular weight: about 1,000)

Production of Aqueous First Base Coating Composition (A)

Production Example 14

28.9 Parts (resin solid content: 13 parts) of Aqueous Polyester Resin (a1) obtained in Production Example 1, 90 parts of "JR-806" (trade name, produced by Tayca Corp., rutile titanium dioxide), 1 part of "Carbon MA-100" (trade name, produced by Mitsubishi Chemical Corp., carbon black) and 42.4 parts of deionized water were mixed and after adjusting the pH to 8.0 with 2-(dimethylamino)ethanol, the mixture was dispersed using a paint shaker for 30 minutes to obtain a pigment dispersion paste. Subsequently, in a stirring/mixing vessel, 162.3 parts (aqueous polyester resin solid content: 13 parts) of the obtained pigment dispersion paste, 26.7 parts (resin solid content: 12 parts) of Aqueous Polyester Resin (a1) obtained in Production Example 1, 55.6 parts (resin solid content: 25 parts) of Aqueous Acrylic Resin (b1) obtained in Production Example 8, 67.6 parts (resin solid content: 25 parts) of Aqueous Urethane Resin (c1) obtained in Production Example 9, 31.3 parts (resin solid content: 25 parts) of "CYMEL 325" (trade name, produced by Nihon Cytec Industries Inc., melamine resin) and 65 parts of deionized water were uniformly mixed. To the obtained mixture, "PRIMAL ASE-60" (trade name, produced by Rohm and Haas Company, thickener), 2-(dimethylamino)ethanol and deionized water were added to obtain Aqueous First Base Coating Composition (A-1) having a pH of 8.2, a coating composition solid content of 47% and a viscosity of 30 seconds as measured with Ford cup No. 4 at 20° C.

Production Examples 15 to 32

Aqueous First Base Coating Compositions (A-2) to (A-32) were obtained in the same manner as in Production Example 14 except that the blending composition of each resin was changed as shown in Table 4 or 5 below.

followed by standing for 2 minutes, and preheating was then performed at 80° C. for 5 minutes. Onto the uncured second base coating film, Clear Coating Composition (C-1) shown below was electrostatically applied to have a thickness of 40 pun in terms of the cured film thickness, left standing for 7 minutes and then heated at 140° C. for 30 minutes, thereby simultaneously curing three coating film layers to manufacture Test Plate A. At all times, electrostatic coating was performed using a rotary atomization-type electrostatic coating machine.

TABLE 4

| Production Example | | | 14 | 15 | 16 | 17 | 18 | 19 | 20 | 21 | 22 | 23 |
|---|---|---|---|---|---|---|---|---|---|---|---|---|
| Name of aqueous first base coating composition (A) | | | A-1 | A-2 | A-3 | A-4 | A-5 | A-6 | A-7 | A-8 | A-9 | A-10 |
| Aqueous polyester resin (a) | | Name | a1 | a1 | a1 | a1 | a2 | a1 | a1 | a1 | a1 | a1 |
| | Blending amount (parts by mass) | Amount carried in from pigment dispersion paste | 13 | 13 | 13 | 13 | 13 | 13 | 13 | 13 | 12 | 13 |
| | | Blending amount except above | 12 | 12 | 7 | 12 | 12 | 12 | 12 | 12 | 0 | 25 |
| | | Total blending amount | 25 | 25 | 20 | 25 | 25 | 25 | 25 | 25 | 12 | 38 |
| Aqueous acrylic resin (b) | | Name | b1 | b1 | b1 | b1 | b1 | b2 | b1 | b1 | b1 | b1 |
| | Blending amount (parts by mass) | | 25 | 20 | 25 | 30 | 25 | 25 | 25 | 25 | 38 | 12 |
| Aqueous urethane resin (c) | | Name | c1 | c1 | c1 | c1 | c1 | c1 | c2 | c3 | c1 | c1 |
| | Blending amount (parts by mass) | | 25 | 30 | 30 | 20 | 25 | 25 | 25 | 25 | 25 | 25 |
| Melamine resin (d) | Blending amount (parts by mass) | | 25 | 25 | 25 | 25 | 25 | 25 | 25 | 25 | 25 | 25 |

TABLE 5

| Production Example | | | 24 | 25 | 26 | 27 | 28 | 29 | 30 | 31 | 32 |
|---|---|---|---|---|---|---|---|---|---|---|---|
| Name of aqueous first base coating composition (A) | | | A-11 | A-12 | A-13 | A-14 | A-15 | A-16 | A-17 | A-18 | A-19 |
| Aqueous polyester resin (a) | | Name | a1 | a1 | a1 | a3 | a4 | a1 | a1 | a1 | a1 |
| | Blending amount (parts by mass) | Amount carried in from pigment dispersion paste | 13 | 13 | 13 | 13 | 13 | 13 | 13 | 13 | 13 |
| | | Blending amount except above | 12 | 2 | 12 | 12 | 12 | 12 | 12 | 12 | 12 |
| | | Total blending amount | 25 | 15 | 25 | 25 | 25 | 25 | 25 | 25 | 25 |
| Aqueous acrylic resin (b) | | Name | b1 | b1 | b1 | b1 | b1 | b3 | b4 | b1 | b1 |
| | Blending amount (parts by mass) | | 38 | 20 | 38 | 25 | 25 | 25 | 25 | 25 | 25 |
| Aqueous urethane resin (c) | | Name | c1 | c1 | c1 | c1 | c1 | c1 | c1 | c4 | c5 |
| | Blending amount (parts by mass) | | 12 | 40 | 25 | 25 | 25 | 25 | 25 | 25 | 25 |
| Melamine resin (d) | Blending amount (parts by mass) | | 25 | 25 | 12 | 25 | 25 | 25 | 25 | 25 | 25 |

<Manufacture of Test Object to be Coated>

Onto an alloyed hot-dip galvanized steel plate, "Elecron HG-350E" (trade name, produced by Kansai Paint Co., Ltd., a thermosetting epoxy resin-based cationic electrodeposition coating composition) was applied by electrodeposition to have a thickness of 20 μm in terms of the cured film thickness and cured by heating at 170° C. for 30 minutes to prepare a test object to be coated.

Example 1

<<Manufacture of Test Plate a for Measurements of Smoothness, Distinctness of Image, Chipping Resistance and Interfacial Peel Strength>>

Aqueous First Base Coating Composition (A-1) obtained in Production Example 14 was electrostatically applied onto the test object to be coated above to have a thickness of 20 μm in terms of the cured film thickness and left standing for 6 minutes. Onto the uncured first base coating film, Aqueous Second Base Coating Composition (B-1) shown below was electrostatically applied to have a thickness of 7 μm in terms of the cured film thickness (first stage) and after an interval of 1.5 minutes, electrostatically applied to have a thickness of 7 μm in terms of the cured film thickness (second stage), Aqueous Second Base Coating Composition (B-1):

"WBC-720H NH-700M" (trade name, produced by Kansai Paint Co., Ltd., a silver-colored acryl.melamine resin-based aqueous base coating composition for automotive top coating)

Aqueous Second Base Coating Composition (B-2):

"WBC-721H NH-700M" (trade name, produced by Kansai Paint Co., Ltd., a silver-colored acryl.melamine resin-based aqueous base coating composition for automotive top coating)

Clear Coating Composition (C-1):

"LUGA BAKE HK-4" (trade name, produced by Kansai Paint Co., Ltd., a melamine-curable clear coating composition, a combination of base resin/curing agent: hydroxyl group-containing resin/melamine resin)

<<Manufacture of Test Piece B for Measurement of Breaking Energy>>

Onto a glass plate, "Elecron HG-350E" (trade name, produced by Kansai Paint Co., Ltd., a thermosetting epoxy resin-based cationic electrodeposition coating composition) was applied by electrodeposition to have a thickness of 20 μm in terms of the cured film thickness and cured by heating at 170° C. for 30 minutes. Onto the cured electrodeposition coating film, Aqueous First Base Coating Composition (A-1) obtained in Production Example 14 was electrostatically applied to have a thickness of 50 μm in terms of the cured film thickness and then cured by heating under the condition of keeping the coating film at 140° C. for 18 minutes. Thereafter, the coating film was peeled off from the glass plate and cut into a strip of 20 mm in length and 5 mm in width to manufacture Test Piece B.

<<Manufacture of Test Pieces C and D for Measurement of Melamine Migration Rate>>

Onto a 1 mm-thick polypropylene plate (Standard Testpiece K.K.), Aqueous Base Coating Composition (A-1) obtained in Production Example 14 was electrostatically applied to have a thickness of 20 μm in terms of the cured film thickness and then cured by heating under the condition of keeping the coating film at 140° C. for 18 minutes. Then, the coating film was peeled off from the polypropylene plate to manufacture Test Piece C.

In addition, onto a 1 mm-thick polypropylene plate (Standard Testpiece K.K.), Aqueous Base Coating Composition (A-1) obtained in Production Example 14 was electrostatically applied to have a thickness of 20 μm in terms of the cured film thickness and then left standing for 6 minutes. Onto the uncured aqueous first base coating film, Aqueous Second Base Coating Composition (B-1) was electrostatically applied to have a thickness of 6 μm in terms of the cured film thickness (first stage) and after an interval of 3 minutes, electrostatically applied to have a thickness of 6 μm in terms of the cured film thickness (second stage), followed by left standing for 3 minutes, and preheating was then performed at 80° C. for 5 minutes. Subsequently, the coating film was cured by heating under the condition of keeping it at 140° C. for 18 minutes and then peeled off from the polypropylene plate to manufacture Test Piece D.

Examples 2 to 12 and Comparative Examples 1 to 13

Test Plate A and Test Pieces B to D of each of Examples 2 to 12 and Comparative Examples 1 to 13 were manufactured in the same manner as in Example 1 except that Aqueous First Base Coating Composition (A-1) and Aqueous Second Base Coating Composition (B-1) were changed to the aqueous first base coating composition and aqueous second base coating composition shown in Tables 6 to 8 below.

<Evaluation Test>

With respect to respective test plates obtained in Examples 1 to 12 and Comparative Examples 1 to 13, evaluation was performed by the following test method. The results obtained are shown in Tables 6 to 8 below.

(Test Method)

Smoothness:

The smoothness was evaluated on each Test Plate A based on the LW value measured using "Wave Scan" (trade name, manufactured by BYK Gardner). A smaller LW value indicates higher smoothness of the coated surface.

Distinctness of Image:

The distinctness of image was evaluated on each Test Plate A based on the SW value measured using "Wave Scan" above. A smaller SW value indicates higher distinctness of image of the coated surface.

Chipping Resistance:

Test Plate A was placed on a sample holder of Flying Stone Tester Model JA-400 (trade name, a chipping test device) manufactured by Suga Test Instruments Co., Ltd., and 50 g of crushed stone of No. 7 was caused at −20° C. to collide against the test plate at an angle of 90° with compressed air of 0.2 MPa (2.0 kgf/cm$^2$) from a distance of 55 cm. Subsequently, Test Plate A obtained was washed with water and dried and after a cloth adhesive tape (produced by Nichiban Co., Ltd.) was adhered to the coated surface and peeled off, the chipping resistance was evaluated according to the following criteria by observing, for example, the degree of scratching of the coating film with an eye.

Score of 1: The scratch size is extremely small, and the electrodeposited surface or the substrate steel plate is not exposed.

Score of 1.5: The scratch size is small, and the electrodeposited surface or the substrate steel plate is not exposed.

Score of 2: The scratch size is small, but the electrodeposited surface or the substrate steel plate is exposed.

Score of 2.5: The scratch size is large, and the substrate steel plate is largely exposed.

Score of 3: The scratch size is considerably large, and the substrate steel plate is also largely exposed.

Interfacial Peel Strength:

With respect to Test Plate A, the minimum adhesive strength (interfacial peel strength) was evaluated using SAICAS Model CN-100 (manufactured by Daipla Wintes Co., Ltd.). While leaving a portion up to 10 μm from the position of the coating film interface between the cured electrodeposition coating film and the first base coating film, which is the portion to be measured for the interlayer adhesive strength, the coating film above the portion was previously removed by cutting. Subsequently, a cut from the cutting interface was formed with a cutting blade (width: 1 mm, rake angle: 20°, angle of relief: 10°), and at the position when cut to 10 μm, the cutting blade was moved only in the horizontal direction to measure the horizontal cutting stress. The minimum value of the stress measured was defined as "minimum adhesive strength".

Breaking Energy:

Using a tensile tester, "Tensilon UTM-II-20" (trade name), manufactured by Orientec Co., Ltd., the breaking energy was measured on Test Piece B under the following measurement conditions in conformity with JIS-K 7113.

Tensile speed: 4 mm/min

Measurement distance: 20 mm

Measurement temperature: 20° C.

Relative humidity: 60% RH

A curve (stress-strain curve) graphically depicting the relationship between normal stress (stress) and normal strain (strain) at a tensile test was prepared, and an integrated value of stress from the starting point of the tensile test to the breaking point was calculated by using the strain as a variable.

Melamine Migration Rate:

An infrared absorption spectrum was measured under the following conditions by using FT/IR-610 manufactured by JASCO Engineering. The peeled surface of Test Piece C from the polypropylene plate was measured by an ATR method with a ZnSe prism at a cumulative number of 32, and the peak height ratio was calculated. Subsequently, the peeled surface of Test Piece D from the polypropylene plate was measured, and the peak height ratio was calculated. The value obtained by dividing the peak height ratio of Test Piece D by the peak height ratio of Test Piece C was defined as the melamine residual rate, and the melamine migration rate was calculated according to the following formula. Here, each peak height ratio is a ratio between an infrared absorption peak height of ester group at 1,725 cm$^{-1}$ and an infrared absorption peak height of melamine resin at 814 cm$^{-1}$.

Melamine migration rate %=(1−(peak height ratio of Test Piece D/peak height ratio of Test Piece C))×100

TABLE 6

| | | | Examples | | | | | | | |
|---|---|---|---|---|---|---|---|---|---|---|
| | | | 1 | 2 | 3 | 4 | 5 | 6 | 7 | 8 |
| Configuration of multilayer coating film | Aqueous first base coating composition (A) | Name | A-1 | A-2 | A-3 | A-4 | A-5 | A-6 | A-7 | A-8 |
| | | Film thickness (μm) | 20 | 20 | 20 | 20 | 20 | 20 | 20 | 20 |
| | Aqueous second base coating composition (B) | Name | B-1 | B-1 | B-1 | B-1 | B-1 | B-1 | B-1 | B-1 |
| | | Film thickness (μm) | 14 | 14 | 14 | 14 | 14 | 14 | 14 | 14 |
| | Clear coating composition (C) | Name | C-1 | C-1 | C-1 | C-1 | C-1 | C-1 | C-1 | C-1 |
| | | Film thickness (μm) | 40 | 40 | 40 | 40 | 40 | 40 | 40 | 40 |
| Evaluation | Finish property | Smoothness (LW value) | 7 | 9 | 6 | 6 | 8 | 8 | 6 | 6 |
| | | Distinctness of image (SW value) | 15 | 15 | 13 | 15 | 15 | 15 | 12 | 15 |
| | Chipping resistance | | 1.5 | 1 | 1.5 | 1 | 1.5 | 1.5 | 1.5 | 1 |
| | Breaking energy (kgf · mm) | | 0.8 | 0.8 | 0.8 | 0.7 | 0.7 | 0.8 | 0.7 | 0.7 |
| | Interfacial peel strength (kN/m) | | 0.45 | 0.45 | 0.45 | 0.5 | 0.45 | 0.45 | 0.45 | 0.5 |
| | Melamine migration rate (%) | | 22 | 20 | 22 | 23 | 24 | 22 | 24 | 20 |

TABLE 7

| | | | Example | | | | Comparative Example | | | | |
|---|---|---|---|---|---|---|---|---|---|---|---|
| | | | 9 | 10 | 11 | 12 | 1 | 2 | 3 | 4 | 5 |
| Configuration of multilayer coating film | Aqueous first base coating composition (A) | Name | A-1 | A-1 | A-1 | A-1 | A-9 | A-10 | A-11 | A-12 | A-13 |
| | | Film thickness (μm) | 15 | 35 | 20 | 20 | 20 | 20 | 20 | 20 | 20 |
| | Aqueous second base coating composition (B) | Name | B-1 | B-1 | B-1 | B-2 | B-1 | B-1 | B-1 | B-1 | B-1 |
| | | Film thickness (μm) | 14 | 14 | 10 | 14 | 14 | 14 | 14 | 14 | 14 |
| | Clear coating composition (C) | Name | C-1 | C-1 | C-1 | C-1 | C-1 | C-1 | C-1 | C-1 | C-1 |
| | | Film thickness (μm) | 40 | 40 | 40 | 40 | 40 | 40 | 40 | 40 | 40 |
| Evaluation | Finish property | Smoothness (LW value) | 9 | 5 | 9 | 7 | 10 | 8 | 8 | 10 | 6 |
| | | Distinctness of image (SW value) | 15 | 18 | 13 | 14 | 20 | 22 | 15 | 12 | 15 |
| | Chipping resistance | | 2 | 1 | 1.5 | 1.5 | 1.5 | 1.5 | 3 | 1.5 | 2.5 |
| | Breaking energy (kgf · mm) | | 0.6 | 1 | 0.6 | 0.8 | 0.8 | 0.7 | 0.5 | 0.7 | 0.7 |
| | Interfacial peel strength (kN/m) | | 0.45 | 0.45 | 0.45 | 0.45 | 0.45 | 0.45 | 0.45 | 0.45 | 0.3 |
| | Melamine migration rate (%) | | 22 | 20 | 22 | 22 | 23 | 24 | 22 | 24 | 28 |

TABLE 8

| | | | Comparative Example | | | | | | | |
|---|---|---|---|---|---|---|---|---|---|---|
| | | | 6 | 7 | 8 | 9 | 10 | 11 | 12 | 13 |
| Configuration of multilayer coating film | Aqueous first base coating composition (A) | Name | A-14 | A-15 | A-16 | A-17 | A-18 | A-19 | A-1 | A-1 |
| | | Film thickness (μm) | 20 | 20 | 20 | 20 | 20 | 20 | 20 | 20 |
| | Aqueous second base coating composition (B) | Name | B-1 | B-1 | B-1 | B-1 | B-1 | B-1 | B-1 | B-1 |
| | | Film thickness (μm) | 14 | 14 | 14 | 14 | 14 | 14 | 7 | 22 |
| | Clear coating composition (C) | Name | C-1 | C-1 | C-1 | C-1 | C-1 | C-1 | C-1 | C-1 |
| | | Film thickness (μm) | 40 | 40 | 40 | 40 | 40 | 40 | 40 | 40 |
| Evaluation | Finish property | Smoothness (LW value) | 7 | 6 | 8 | 10 | 7 | 8 | 14 | 5 |
| | | Distinctness of image (SW value) | 20 | 15 | 22 | 25 | 19 | 13 | 12 | 20 |
| | Chipping resistance | | 2 | 2.5 | 2.5 | 2.3 | 2.5 | 2.5 | 2 | 1.5 |
| | Breaking energy (kgf · mm) | | 0.6 | 0.5 | 0.5 | 0.6 | 0.55 | 0.55 | 0.6 | 0.6 |
| | Interfacial peel strength (kN/m) | | 0.45 | 0.45 | 0.45 | 0.45 | 0.45 | 0.4 | 0.45 | 0.45 |
| | Melamine migration rate (%) | | 22 | 20 | 22 | 23 | 24 | 22 | 28 | 20 |

It is found from the results in Tables 6 to 8 that in the multilayer coating films of Examples 1 to 12, the LW value evaluating the smoothness is 9 or less in all cases, the SW value evaluating the distinctness of image is 18 or less, and thus, all coating films are excellent in smoothness and distinctness of image. In addition, these coating films had chipping resistance. Furthermore, these coating films had a breaking energy of 0.6 kgf·mm or more, an interfacial peel strength of 0.4 kN/m or more, and a melamine migration rate of 25% or less and thus were found to have excellent mechanical properties as well.

The invention claimed is:

1. A method for forming a multilayer coating film, comprising:

(1) a step of applying an aqueous first base coating composition (A) onto a cured electrodeposition coating film to form a first base coating film (BC1) with a thickness of 15 to 35 μm in terms of a cured film thickness thereof;

(2) a step of applying an aqueous second base coating composition (B) onto the first base coating film without preheating, to form a second base coating film (BC2) with a thickness of 8 to 18 μm in terms of a cured film thickness thereof;

(3) a step of applying a clear coating composition (C) onto the second base coating film after preheating, to form a clear coating film with a thickness of 25 to 50 μm in terms of a cured film thickness thereof; and (4) a step of heat-curing the first base coating film, the second base coating film, and the clear coating film simultaneously to form a cured coating film, wherein the aqueous first base coating composition (A) contains from 15 to 35 parts by mass of an aqueous polyester resin (a), from 15 to 30 parts by mass of an aqueous acrylic resin (b), from 15 to 30 parts by mass of an aqueous urethane resin (c), and from 15 to 35 parts by mass of a melamine resin (d), each based on 100 parts by mass of the total resin solid content of the resin (a), resin (b), resin (c) and resin (d), wherein the aqueous polyester resin (a) is obtained by an esterification or transesterification reaction of a polybasic acid component and an alcohol component and has an acid value of 15 to 25 mgKOH/g and a number average molecular weight of 1,000 to 5,000, wherein the polybasic acid component contains an aromatic ring-containing polybasic acid and/or an alicyclic ring-containing polybasic acid in a ratio of 65 to 75 mol % based on the total amount of polybasic acids, wherein the aqueous acrylic resin (b) is an acrylic emulsion obtained by emulsion polymerization of monomer components containing, based on the total mass of monomers, from 45 to 80 mass % of a polymerizable unsaturated monomer having an alkyl group with 4 to 8 carbon atoms, from 1 to 10 mass % of a hydroxyl group-containing polymerizable unsaturated monomer, from 1 to 10 mass % of a carboxyl group-containing polymerizable unsaturated monomer, and from 0 to 53 mass % of another polymerizable unsaturated monomer, wherein the aqueous urethane resin (c) is obtained by reacting a polyurethane prepolymer that is obtained by reaction of a polyisocyanate compound, a polyol compound containing a polycarbonate polyol having an alicyclic structure, and an acidic group-containing polyol compound, with a chain extender having reactivity with an isocyanate group of the polyurethane polymer, and a ratio of the alicyclic structure contained is from 45 to 65 mass % based on solid content, wherein a breaking energy at 20° C. of a coating film formed of the aqueous first base coating composition (A) is 0.6 kgf·mm or more, wherein a peel strength at a coating film interface of the cured electrodeposition coating film and the first base coating film, as measured by surface-interfacial cutting method (SAICAS method), is 0.4 kN/m or more, and wherein in an infrared absorption spectrum, a melamine migration rate that is a value obtained by dividing a peak height ratio of a composite film composed of the first base coating film and the second base coating film by a peak height ratio of a single film of the first base coating film, is from 0 to 25%, wherein each peak height ratio is a ratio between an infrared absorption peak height of ester group at 1,725 $cm^{-1}$ and an infrared absorption peak height of melamine resin at 814 $cm^{-1}$.

2. The method according to claim 1, wherein the aromatic ring-containing polybasic acid (a-1-1) is selected from the group consisting of phthalic acid, phthalic anhydride, isophthalic acid, trimellitic acid, and trimellitic anhydride, and the alicyclic ring-containing polybasic acid (a-1-2) is selected from the group consisting of 1,2-cyclohexanedicarboxylic acid, 1,2-cyclohexanedicarboxylic anhydride, 1,3-cyclohexanedicarboxylic acid, 1,4-cyclohexanedicarboxylic acid, 4-cyclohexene-1,2-dicarboxylic acid, and 4-cyclohexene-1,2-dicarboxylic anhydride.

3. The method according to claim 1, wherein the aromatic ring-containing polybasic acid (a-1-1) and the alicyclic ring-containing polybasic acid (a-1-2) are used in a molar ratio of (a-1-1)/(a-1-2) of 35/65 to 0/100.

4. The method according to claim 1, wherein the aqueous polyester resin (a) has an acid value of 18 to 23 mgKOH/g or a number average molecular weight of 1,200 to 4,000.

5. The method according to claim 1, wherein the polymerizable unsaturated monomer having an alkyl group with 4 to 8 carbon atoms is selected from the group consisting of n-butyl (meth)acrylate and 2-ethylhexyl (meth)acrylate.

6. The method according to claim 1, wherein the hydroxyl group-containing polymerizable unsaturated monomer is selected from the group consisting of 2-hydroxyethyl (meth)acrylate, 2-hydroxypropyl (meth)acrylate, 3-hydroxypropyl (meth)acrylate and 4-hydroxybutyl (meth)acrylate.

7. The method according to claim 1, wherein the carboxyl group-containing polymerizable unsaturated monomer is selected from the group consisting of acrylic acid and methacrylic acid.

8. The method according to claim 1, wherein the aqueous acrylic resin (b) is an acrylic emulsion obtained by emulsion polymerization of monomer components containing, based on the total mass of monomers, from 50 to 75 mass % of the polymerizable unsaturated monomer having an alkyl group with 4 to 8 carbon atoms, from 2 to 9 mass % of the hydroxyl group-containing polymerizable unsaturated monomer, from 1 to 8 mass % of the carboxyl group-containing polymerizable unsaturated monomer, and from 8 to 47 mass % of the another polymerizable unsaturated monomer.

9. The method according to claim 1, wherein the aqueous acrylic resin (b) has a hydroxyl value of 4.5 to 50 mgKOH/g, an acid value of 7 to 75 mgKOH/g, and a weight average molecular weight of 2,000 to 5,000,000.

10. The method according to claim 1, wherein the aqueous urethane resin (c) is a colloidal dispersion urethane resin or an emulsion urethane resin.

11. The method according to claim 1, wherein the aqueous first base coating composition (A) contains from 20 to 30 parts by mass of the aqueous polyester resin (a), from 20 to 25 parts by mass of the aqueous acrylic resin (b), from 20 to 25 parts by mass of the aqueous urethane resin (c), and from 20 to 30 parts by mass of the melamine resin (d), each based on 100 parts by mass of the total resin solid content of the resin (a), resin (b), resin (c) and resin (d).

12. The method according to claim 1, wherein the aqueous second base coating composition (B) contains a base resin, a curing agent, and a coloring pigment and/or an effect pigment.

13. The method according to claim 1, wherein in the step (2), the aqueous second base coating composition (B) is applied by two-stage application.

14. The method according to claim 1, wherein the clear coating composition (C) is a melamine-curable clear coating composition or an acid/epoxy-curable clear coating composition.

* * * * *